United States Patent
Akabori et al.

(10) Patent No.: US 6,330,508 B1
(45) Date of Patent: Dec. 11, 2001

(54) PRECEDING VEHICLE FOLLOWING CONTROL SYSTEM

(75) Inventors: Kouichi Akabori, Kanagawa; Yoshinori Yamamura, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/609,242

(22) Filed: Jun. 30, 2000

(30) Foreign Application Priority Data

Jun. 30, 1999 (JP) .................................................. 11-186497

(51) Int. Cl.$^7$ ............................... B60K 31/00; B60T 7/12
(52) U.S. Cl. .................................. 701/96; 701/93; 701/97; 340/903
(58) Field of Search .................................. 701/93, 96, 97, 701/301; 180/333; 123/352; 318/568.1, 570, 571, 587; 340/435, 903, 988

(56) References Cited

U.S. PATENT DOCUMENTS

| | | | |
|---|---|---|---|
| 5,166,881 | * 11/1992 | Akasu ..................................... | 701/96 |
| 5,805,103 | * 9/1998 | Doi et al. ............................... | 342/70 |
| 5,959,572 | 9/1999 | Higashimata et al. ................. | 342/70 |
| 6,223,117 | * 4/2001 | Labuhn et al. ......................... | 701/93 |

FOREIGN PATENT DOCUMENTS 7-047862   2/1995   (JP) .

* cited by examiner

*Primary Examiner*—Tan Nguyen
*Assistant Examiner*—Dalena Tran
(74) *Attorney, Agent, or Firm*—Foley & Lardner

(57) ABSTRACT

A preceding vehicle following control apparatus includes a speed sensor for sensing a vehicle speed of a controlled vehicle, a spacing sensor for sensing a spacing or distance from the controlled vehicle to a preceding vehicle, and a following controller. In addition to a following mode for controlling the driving/braking force of the controlled vehicle in accordance with the spacing and the vehicle speed, the following controller has a wait mode, an auto-stop mode and a release mode. The following controller initially sets the control mode to the wait mode, and changes the control mode from the wait mode to one of the auto-stop mode and the following mode depending on whether the controlled vehicle is in a stop state or not. The controller changes the control mode between the auto-stop mode and the following mode in accordance with the spacing and the vehicle speed, changes the control mode to the release mode in response to a driver's operation such as a transmission range changing operation and a braking operation, and returns the control mode from the release mode to the wait mode in response to a driver's accelerating or braking operation.

18 Claims, 13 Drawing Sheets

PRECEDING VEHICLE FOLLOWING CONTROL SYSTEM

BACKGROUND OF THE INVENTION

The present invention relates to preceding vehicle following control technique for controlling a vehicle spacing or distance from a controlled vehicle to a preceding vehicle.

A Japanese Patent Kokai Publication No. H7(1995)-47862 shows a conventional vehicle following control system.

When set by a driver, a preceding vehicle following control system of earlier technology controls a vehicle spacing or distance to a preceding vehicle at a desirable value in the presence of a preceding vehicle, and controls the vehicle speed at a preset vehicle speed in the absence of a preceding vehicle. The following control is canceled in response to a driver's depression on a brake pedal, a driver's accelerating operation on an accelerator pedal, or a driver's shift operation. A main objective of the following control is to reduce the burden on a driver in high speed operations. There is a further demand for an automatic system for low speed operations and for controlling stop and restart of a vehicle automatically.

SUMMARY OF THE INVENTION

In preceding vehicle following control systems of earlier technology, the following control is canceled by a driver's braking operation. Therefore, an operation to start the following control in the stop state is somewhat cumbersome since it requires a first operation of releasing the brake and a second operation for setting the following control. Moreover, a driver might feel uneasy if the vehicle would start moving toward a preceding vehicle on a downhill slope by cancellation of a braking force for automatic stoppage due to driver's cancellation of the following control.

It is, therefore, an object of the present invention to provide apparatus and/or method capable of readily setting a following control in a stop state.

Another object is to provide apparatus and/or method capable of canceling a following control smoothly without giving a driver unnatural feeling.

Still another object is to provide apparatus and/or method facilitating adjustment of a preset vehicle speed.

According to the present invention, a preceding vehicle following control apparatus for a controlled vehicle comprises a following controller:
which collects input information on vehicle operating conditions of the controlled vehicle, inclusive of a sensed actual vehicle speed of the controlled vehicle and a sensed actual vehicle-to-vehicle spacing or distance from the controlled vehicle to a preceding vehicle,
which controls a longitudinal (driving/braking) force of the controlled vehicle in accordance with the actual vehicle speed and the actual vehicle spacing in a following mode,
which sets a control mode initially to a wait mode,
which changes the control mode from the wait mode to one of the following mode and an auto-stop mode (which is a mode to hold the controlled vehicle in a stop state by producing a braking force of the controlled vehicle), in accordance with the input information,
which allows the control mode to change among the auto-stop mode, the following mode and a release mode, in accordance with the input information, and
which returns the control mode to the wait mode from the release mode.

A preceding vehicle following control apparatus according to another aspect of the present invention, comprises the following means: means for collecting input information including a sensed actual vehicle speed and a sensed actual vehicle spacing; means for controlling a driving force or a braking force of the controlled vehicle in accordance with the actual vehicle speed and the actual vehicle spacing; means for changing a control mode from a wait mode to an auto-stop mode in response to a wait-to-stop condition signal; means for changing the control mode from the wait mode to the following mode in response to a wait-to-follow condition signal; means for changing the control mode from the auto-stop mode or the following mode, to a release mode in response to a release condition signal; and means for returning the control mode to the wait mode from the release mode in response to a release-to-wait condition signal.

A preceding vehicle following control process according to one aspect of the present invention, comprises: performing a following control in one of a following mode and an auto-stop mode; changing a control mode from a wait mode to the auto-stop mode in response to a wait-to-stop condition signal; changing the control mode from the wait mode to the following mode in response to a wait-to-follow condition signal; changing the control mode from one of the auto-stop mode and the following mode, to a release mode in response to a release condition signal; and returning the control mode to the wait mode from the release mode in response to a release-to-wait condition signal.

DETAILED DESCRIPTION OF THE INVENTION

Figure 1:
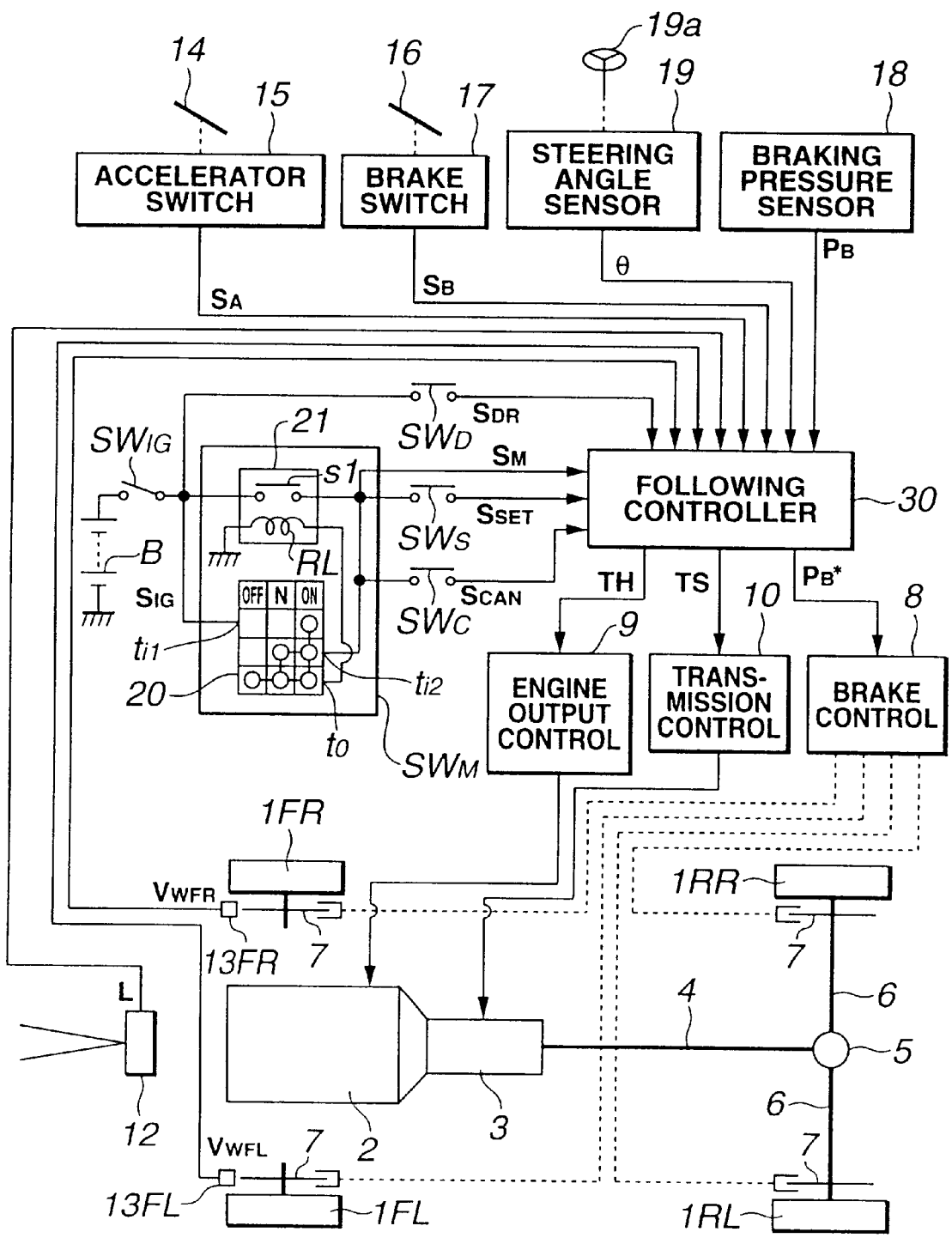
FIG. 1 is a schematic view showing a preceding vehicle following control system according to a first embodiment of the present invention.

FIG. 1 shows a vehicle (controlled vehicle) equipped with a preceding vehicle following control system according to a first embodiment of the present invention. In the example of FIG. 1, the controlled vehicle is a rear wheel drive vehicle having left and right front non-driving wheels 1FL and 1FR and left and right rear driving wheels 1RL and 1RR. A driving force of an engine 2 is transmitted through an automatic transmission 3, a propeller shaft 4, a final reduction assembly 5 and rear axle shafts 6 to the rear wheels 1RL and 1RR.

Four disc brakes 7 are provided, respectively, for the four wheels 1FL, 1FR, 1RL and 1RR. A brake control unit 8 controls the brake oil pressure in each disc brake 7.

The brake control unit 8 produces a brake fluid pressure in response to a depression of a brake pedal 16. Moreover, the brake control unit 8 produces the brake fluid pressure in response to a brake control signal representing a desired brake fluid pressure PB* supplied from a following controller 30.

An engine output control unit 9 controls the output of the engine 2. One way to control the engine output is to control the engine speed (rpm) by regulating the opening (degree) TH of a throttle valve for the engine 2. Another way is to control an idle speed of the engine 2 by regulating the opening of an idle control valve. In the example of FIG. 1, the engine output control unit 9 is arranged to regulate the throttle valve opening TH.

A transmission control unit 10 controls a shift position of the automatic transmission. In response to an up/down shift control signal TS from the following controller 30, the transmission control unit 10 controls the shift position of the automatic transmission 3 in the upshift direction or downshift direction.

A vehicle spacing sensor (or distance sensor) 12 is a device for sensing a vehicle spacing (or vehicle-to-vehicle distance or separation) from the controlled vehicle to a preceding vehicle ahead. In this example, the spacing sensor 12 is a radar type sensor disposed at a front lower portion of the vehicle body, and arranged to transmit laser light sweepingly and receive light reflected from a preceding vehicle. The spacing sensor 12 serves as means for sensing a vehicle spacing.

Wheel speed sensors 13FL and 13FR are arranged to sense wheel speeds of the left and right front non-driving wheels 1FL and 1FR, respectively. In this example, the wheel speed sensors 13FL and 13FR are used as means for sensing a vehicle speed.

An accelerator switch 15 is a device for sensing a driver's operation or intention of accelerating the controlled vehicle. In this example, the accelerator switch 15 is arranged to detect a depression of an accelerator pedal 14 of the controlled vehicle.

A brake switch 17 is a device for sensing a driver's operation or intention of braking the vehicle. In this example, the brake switch 17 is arranged to detect a depression of a brake pedal 16.

A brake pressure sensor 18 senses the brake pressure outputted from the brake control unit 8. In this example, the sensed brake pressure is used to detect a driver's operation or intention of increasing the braking force (in steps S24 and S34).

A steering angle sensor 19 senses a steering angle θ of a steering wheel 19a of the controlled vehicle.

A main switch SWM is an input device for selecting execution or non-execution of the following control. The main switch SWM serves as start commanding means for producing a start command signal.

There are further provided a set switch SWS, and a cancel switch SWC serving as cancel commanding means for producing a cancel command signal.

A drive range detecting switch SWD is a device turning on when a drive range is selected with a select lever of the transmission 3.

The main switch SWM of this example includes a momentary type selector switch 20 to be operated by a driver, and a self-holding type relay circuit 21. The selector switch 20 has one terminal connected through an ignition switch SWIG to a battery B.

The selector switch 20 has an off position, a neutral position and an on position. In the off position, a first input terminal ti1 for receiving an switch signal SIG from the ignition switch SWIG is disconnected from an output terminal t0. In the neutral position, a second input terminal ti2 for receiving power supply from the relay circuit 21 is connected with the output terminal t0. In the on position, the first and second input terminals ti1 and ti2 are connected with the output terminal t0.

The relay circuit 21 has a normally open contact s1 and a relay coil RL for driving the normally open contact s1. One end of the normally open contact s1 is connected with the ignition switch SWIG. The other end of the normally open contact s1 is connected to the following controller 30 directly on one hand and through the set switch SWS, as shown in FIG. 1. The other end of the normally open contact s1 is further connected to the second input terminal ti2 of the selector switch 20. One end of the relay coil RL is connected with the output terminal to of the selector switch 20, and the other end of the relay coil RL is grounded.

Figure 2:
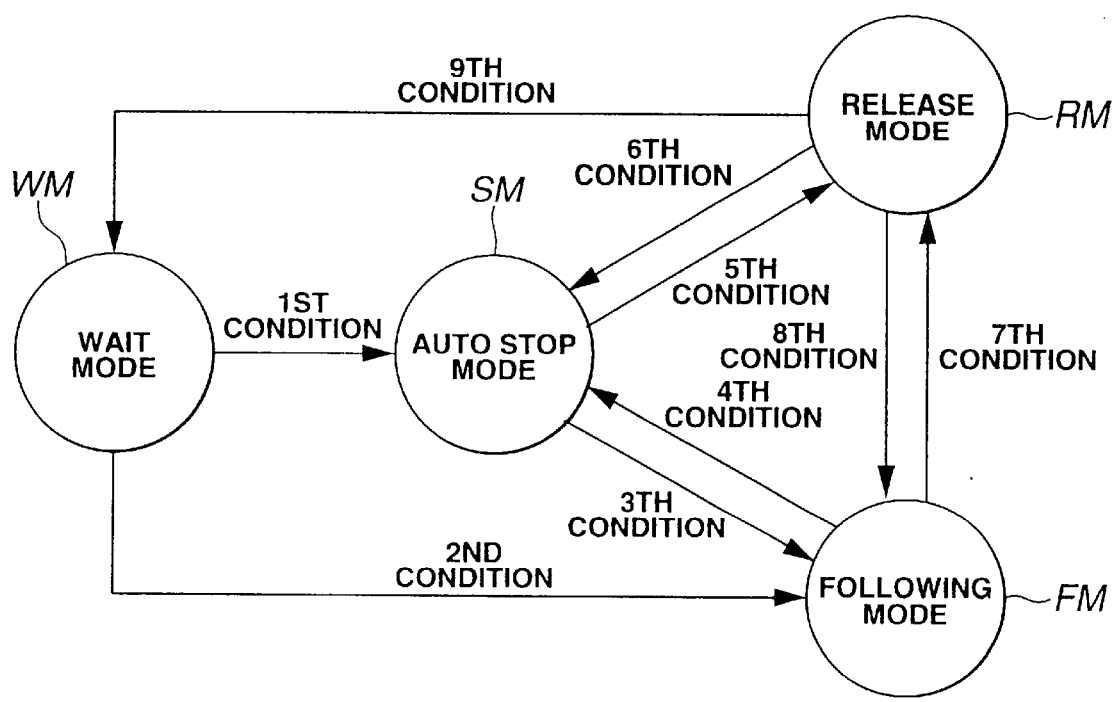
FIG. 2 is a view for illustrating transition among various control modes in the following control system of FIG. 1.

The following controller 30 collects input information by receiving sensor signals from the vehicle spacing sensor 12, the wheel speed sensors 13FL and 14FR, the accelerator switch 15, the brake switch 17, the brake pressure sensor 18 and the steering angle sensor 19, and further receiving switch signals SM, SSET and SCAN from the main switch SWM, the set switch SWS, and the cancel switch SWC, and a switch signal SDR from the drive range detecting switch SWD. In accordance with the input information, the following controller 30 changes over a control mode among a wait mode (control waiting mode) WM, an auto-stop mode SM, a following mode FM and a release mode RM, as shown in FIG. 2.

The auto-stop mode SM is a mode for holding the controlled vehicle in a stop or rest state by holding a braking force at a predetermined magnitude. The following mode FM is a mode for performing a vehicle speed control to bring the actual speed Vs closer to a preset vehicle speed Vset when a preceding vehicle is not detected, and to bring the actual vehicle spacing L closer to a desired vehicle spacing L* when a preceding vehicle is detected, by controlling the brake control unit 8, the engine control unit 9 and the transmission control unit 10. The release mode RM is a mode for canceling the auto-stop mode SM or the following mode FM, but holding the braking force produced in the auto-stop mode or the following mode.

When the main switch SWM is turned on, the following controller 30 changes the control mode from a control off state to the wait mode WM.

The control mode is changed from the wait mode to the auto-stop mode SM if, in the wait mode, a predetermined first transition (or wait-to-stop mode-change) condition is satisfied. In this example, the first transition condition is satisfied when first the automatic transmission 3 is in the drive range, second the controlled vehicle is in the stop (or rest) state, and third the set switch SWs is in the on state.

From the wait mode WM, the control mode is changed to the following mode FM if, in the wait mode, a predetermined second (wait-to-follow) transition condition is satisfied. In this example, the second transition condition is satisfied when first the automatic transmission 3 is in the drive range, second the brake switch 17 is in the off state, and third the set switch SWs is in the on state.

From the auto-stop mode SM, the control mode is changed to the following mode FM if a predetermined third (stop-to-follow) transition condition is satisfied in the auto-stop mode SM. In this example, the third transition condition is satisfied when a preceding vehicle moves forward by a predetermined amount from the position of the preceding vehicle at the time of the start of the auto-stop mode SM.

From the following mode FM, the control mode is changed to the auto-stop mode SM if a predetermined fourth (follow-to-stop) transition condition is satisfied in the following mode FM. In this example, the fourth transition condition is satisfied when first the sensed actual vehicle spacing L to a preceding vehicle is equal to or smaller than a predetermined spacing value, and second the sensed actual vehicle speed Vs of the controlled vehicle is equal to or lower than a predetermined speed value.

If a predetermined fifth (stop-to-release) transition condition is satisfied in the auto-stop mode SM, the control mode is changed from the auto-stop mode SM to the release mode RM. In this example, the fifth transition condition is satisfied when any one or more of first, second and third subordinate conditions is satisfied. The first subordinate condition is satisfied when the cancel switch SWc is turned off. The second subordinate condition is satisfied when the steering wheel angle θ sensed by the steering angle sensor 19 becomes equal to or greater than a predetermined angle value. The third subordinate condition is satisfied when the automatic transmission 3 is shifted out of the drive rage to another range.

If a predetermined sixth (release-to-stop) transition condition is satisfied in the release mode RM, the control mode is changed from the release mode RM to the auto-stop mode SM. The sixth transition condition is satisfied when first the controlled vehicle is in the stop state, second the control range of the automatic transmission 3 is the drive range, and third the set switch SWs is in the on state.

If a predetermined seventh (follow-to-release) transition condition is satisfied in the following mode FM, the following controller 30 effects a mode change from the following mode FM to the release mode RM. In this example, the seventh transition condition is satisfied when the driver performs any one or more of a depressing operation of the accelerator pedal 14 (accelerating operation), a depressing operation of the brake pedal 16 (braking operation) and a shift operation from the drive range to another range.

If a predetermined eighth (release-to-follow) transition condition is satisfied in the release mode SM, the following controller 30 effects a mode change from the release mode RM to the following mode FM. In this example, the eighth transition condition is satisfied when first the controlled vehicle is in a running state in the release mode, second the automatic transmission 3 is in the drive range, and third the set switch SWs is in the on state.

If a predetermined ninth (release-to-wait) transition condition is satisfied in the release mode SM, the following controller 30 effects a mode change from the release mode RM to the wait mode WM. In this example, the ninth transition condition is satisfied when the accelerator switch 15 or the brake switch 17 is in the on state.

When the main switch SWM is turned to the off state in the wait mode WM, the control system returns to the control off state.

Figure 3:
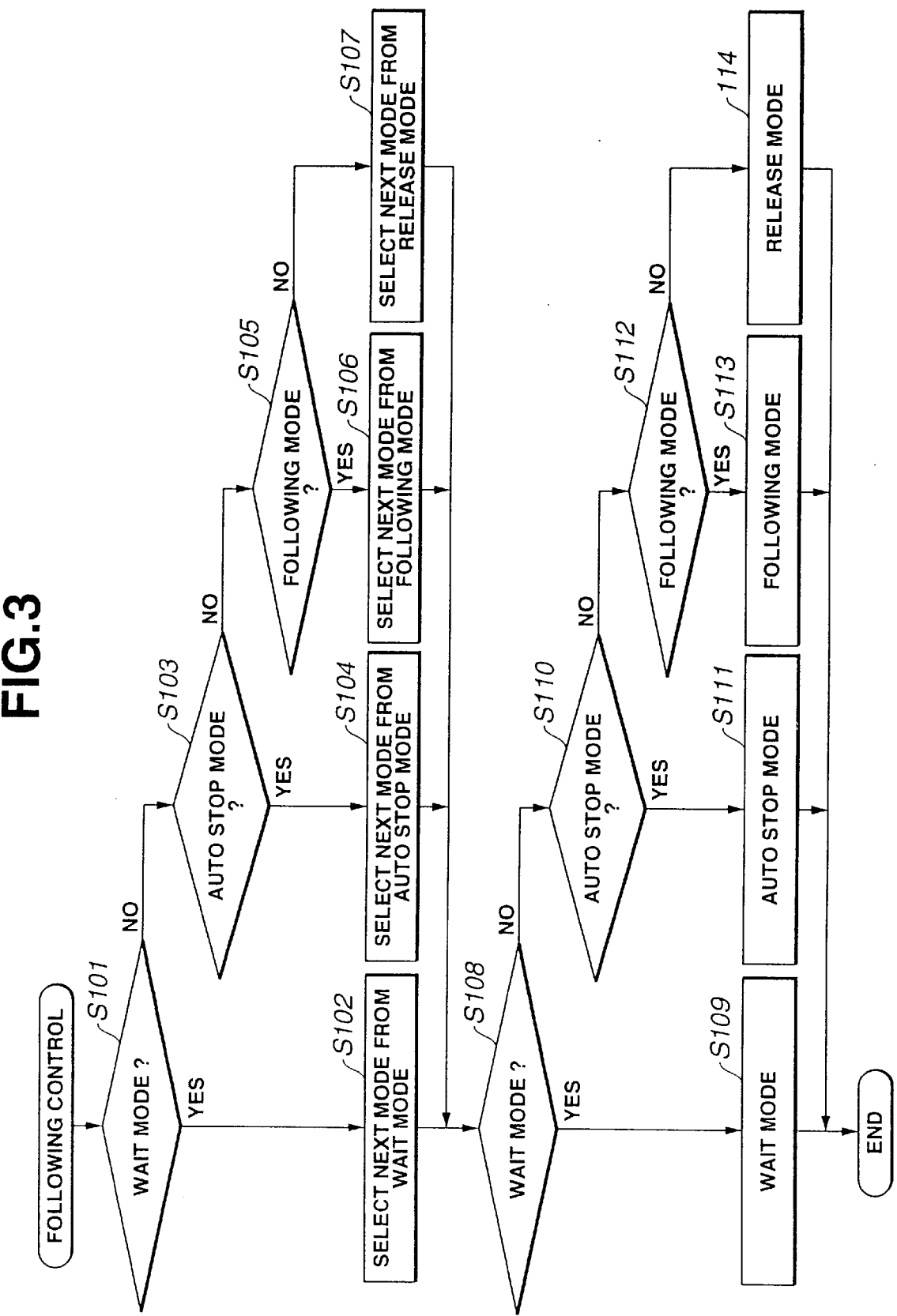
FIG. 3 is a flow chart showing a following control procedure performed by a following controller in the control system of FIG. 1.

FIG. 3 shows a following control procedure performed, as a main program, by the following controller 30.

At a step S101, the controller 30 examines whether the current control mode is the wait mode WM, or not. In the case of the wait mode WM, the controller 30 proceeds to a step S102, and performs, at the step S102, a next mode selection process for selecting a target mode to be reached by transition from the wait mode WM. After the step S102, the controller 30 proceeds to a step S108.

When the current control mode is not the wait mode WM and hence the answer of the decision step S101 is negative, then the controller 30 proceeds to a step S103, and examines whether the current control mode is the auto-stop mode or not. If it is, the controller 30 proceeds to a step S104 to perform a next mode selection process for selecting a target mode to be reached by transition from the auto-stop mode SM. After the step S104, the controller 30 proceeds to the step S108.

If the current control mode is not the auto-stop mode SM, the controller 30 proceeds from the step S103 to a step S105, and examines whether the current control mode is the following mode FM or not. In the case of the following mode FM, the controller 30 proceeds to a step S106 and performs a next mode selection process for selecting a target mode to be reached by transition from the following mode FM at the step S106. Thereafter, the controller 30 proceeds to the step S108.

If the current control mode is not the following control mode FM, then the controller 30 proceeds from the step S105 to a step S107, and performs a next mode selection process for selecting a target mode to be reached by transition from the release mode RM at the step S107. Thereafter, the controller 30 proceeds to the step S108.

At the step S108, the controller 30 determines whether the current control mode is the wait mode WM or not, like the step S101. In the case of the wait mode WM, the controller 30 performs a wait mode process at a step S109, and then terminates the following control process of FIG. 3. If it is not the wait mode WM, the controller 30 proceeds to a step S110.

At the step S110, the controller 30 determines whether the current control mode is the auto-stop mode SM or not, like the step S103. In the case of the auto-stop mode SM, the controller 30 performs a auto-stop mode process at a step S111, and then terminates the following control process. If it is not the auto-stop mode SM, the controller 30 proceeds to a step S112.

At the step S112, the controller 30 determines whether the current control mode is the following mode FM or not, like the step S105. In the case of the following mode FM, the controller 30 performs a following mode process at a step S113, and then terminates the following control process of FIG. 3. If it is not the following mode FM, the controller 30 performs a release mode process at a step S114, and terminate the following control process.

Figure 4:
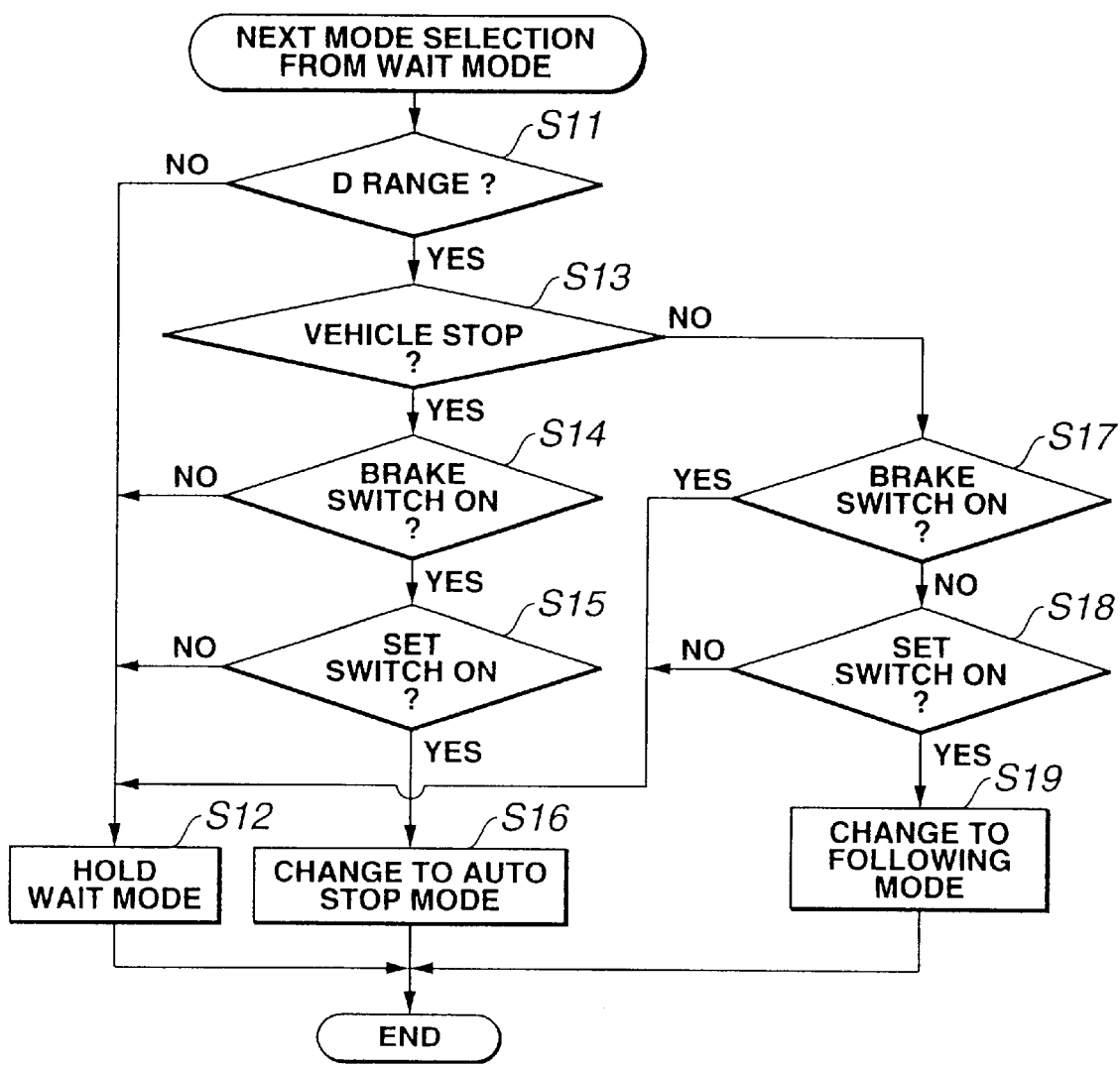
FIG. 4 is a flow chart showing a procedure in a step S102 of FIG. 3, for selecting a next mode reached from a wait mode.

FIG. 4 shows the next mode selecting process from the wait mode, of the step S102.

First, at a step S11, the controller 30 examines whether the range of the automatic transmission 3 is the drive range or not. If the range of the automatic transmission 3 is other than the drive range, the controller 30 proceeds to a step S12 and holds the wait mode WM. Thereafter, the controller 30 terminates the process of FIG. 4. In the case of the drive range, the controller 30 proceeds to a step S13.

At the step S13, the controller 30 examines whether the controlled vehicle is in the stop state by examining whether the vehicle speed Vs of the controlled vehicle is equal to "zero". In this example, the vehicle speed Vs is calculated from the wheel speeds VwFL and VwFR sensed by the front wheel speed sensors 13FL and 13FR, as mentioned later. If the controlled vehicle is in the stop state, the controller 30 proceeds to a step S14, and examines whether the brake switch 17 is in the on state or not. From the step S14, the controller 30 proceeds to the step S12 in the case of the brake switch 17 being in the off state, and proceeds to a step S15 in the case of the on state.

At the step S15, the controller 30 examines whether the set switch SWs is in the on state or not. In the case of the off state of the set switch SWs, the controller 30 proceeds to the step S12. In the case of the on state of the set switch SWs, the controller 30 proceeds to a step S16. At the step S16, the controller 30 effects a (wait-to-stop) mode change from the wait mode WM to the auto-stop mode SM. Then, the controller 30 terminates the process of FIG. 4.

When the controlled vehicle is in a running state, the controller 30 proceeds from the step S13 to a step S17 to examine whether the brake switch 17 is in the on state or not. From the step S17, the controller 30 proceeds to the step S12 in the case of the on state of the brake switch 17, and to a step S18 in the case of the off state of the brake switch 17. At the step S18, the controller 30 examines whether the set switch SWs is in the on state or not. The controller 30 proceeds to the step S12 in the case of the off state of the set switch SWs and to a step S19 in the case of the on state of the set switch SWs. The controller 30 changes the control mode to the following mode FM at the step S19, and thereafter terminates the process of FIG. 4.

The step S11, S13~S15 are decision steps for checking the first condition for mode change from the wait mode WM to the auto-stop mode SM. The steps S11, S13, S17 and S18 are designed to check the second condition for mode change from the wait mode WM to the following mode FM.

Figure 5:
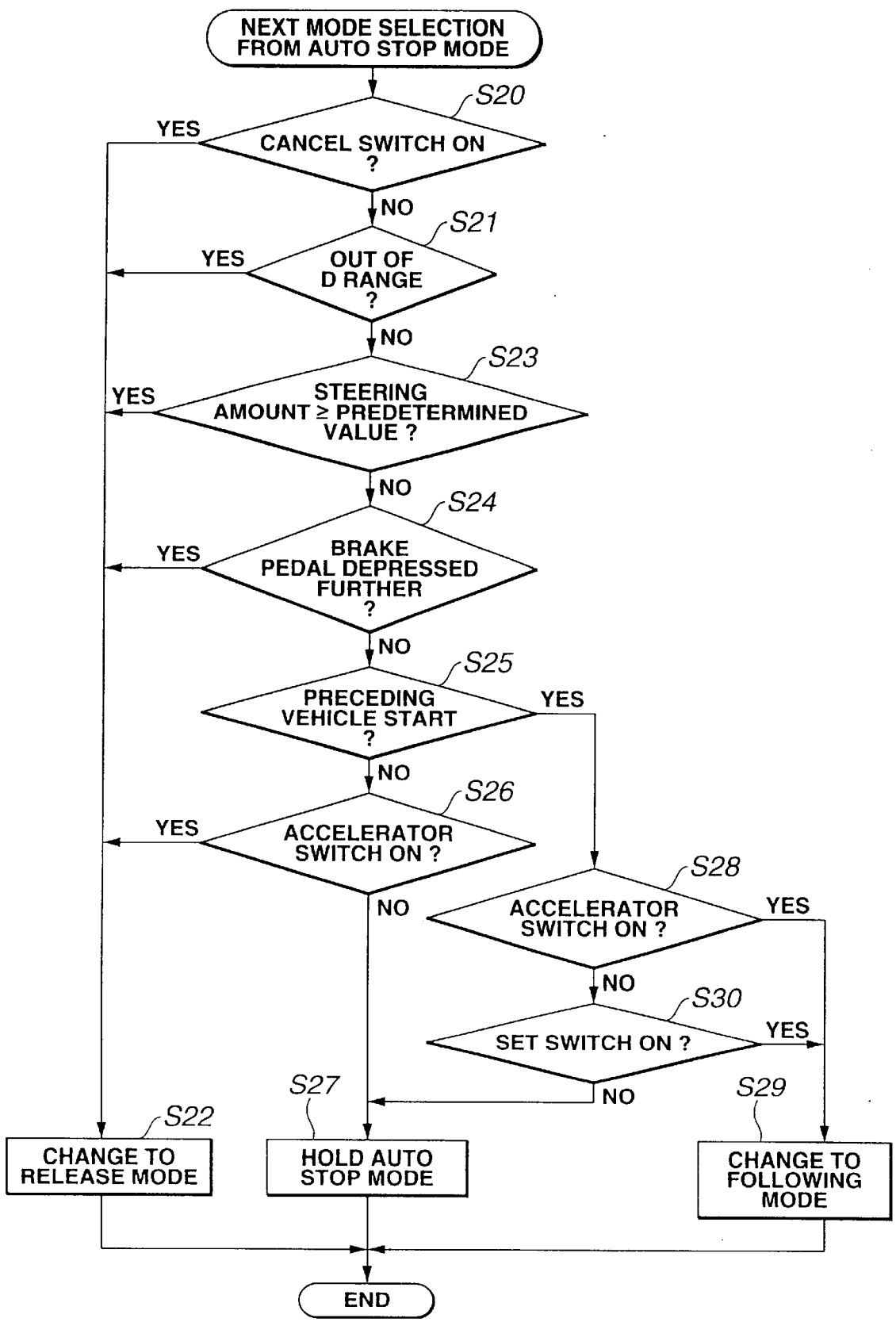
FIG. 5 is a flow chart showing a procedure in a step S104 of FIG. 3, for selecting a next mode from an auto-stop mode.

FIG. 5 shows the next mode selecting process from the auto-stop mode, of the step S104.

First, at a step S20, the controller 30 examines whether the cancel switch SWc is in the on state or not. If the cancel switch SWC is in the on state, the controller 30 proceeds to a step S22 and changes the control mode to the release mode RM. Thereafter, the controller 30 terminates the process of FIG. 5. If the cancel switch SWc is in the off state, the controller 30 proceeds to a step S21. At the step S21, the controller 30 examines whether the range of the automatic transmission 3 is shifted out of the drive range or not. If the range of the automatic transmission 3 is other than the drive range, the controller 30 proceeds to the step S22 to change the control mode to the release mode RM. In the case of the drive range being held unchanged, the controller 30 proceeds to a step S23.

At the step S23, the controller 30 examines whether the steering angle θ sensed by the steering angle sensor 19 is equal to or greater than a predetermined angle value θs. If θ≧θs, the controller 30 proceeds to the step S22. If θ<θs, then the controller 30 proceeds to a step S24. At the step S24, the controller 30 determines whether the brake pedal 16 is depressed further, by examining whether a current brake pressure PB(n) sensed by the brake pressure sensor 18 is greater than a previous value PB(n−1) of the brake pressure obtained in the previous control cycle. From the step S24, the controller 30 proceeds to the step S22 if the brake pedal 16 is depressed further, and to a step S25 if it is not.

At the step S25, the controller 30 determines whether a preceding vehicle has started, by examining whether the vehicle spacing L sensed by the vehicle spacing sensor 12 is increased by an amount equal to or greater than a predetermined value ΔL. If the increase of the actual vehicle spacing L is smaller than the predetermined value ΔL, the controller 30 presumes the preceding vehicle is still in the stop state, and proceeds to a step S26. At the step S26, the controller 30 examines whether the accelerator switch 15 is in the on state or not. From the step S26, the controller 30 proceeds to the step S22 in the case of the on state of the accelerator switch 15, and to a step S27 in the case of the off state of the accelerator switch 15. At the step S27, the controller 30 holds the auto-stop mode SM and terminates the process.

If the increase of the actual vehicle spacing L is equal to or greater than the predetermined value ΔL, the controller 30 presumes that the preceding vehicle has started, and proceeds from the step S25 to a step S28 to examine whether the accelerator switch 15 is in the on state or not. If the accelerator switch 15 is in the on state, the controller 30 proceeds from the step S28 to a step S29, and changes the control mode to the following mode at the step S29. Then, the controller 30 terminates the process of FIG. 5. If the accelerator switch 15 is in the off state, the controller 30 proceeds to a step S30 and examines whether the set switch SWs is in the on state or not. The controller 30 proceeds to the step S27 if the set switch SWs is in the off state, and to the step S29 if the set switch SWs is in the on state.

In the next mode selecting process of FIG. 5, the steps S20, S21, S23, S24 and S26 are a program section for checking the fifth condition for stop-to-release mode change from the auto-stop mode SM to the release mode RM. The steps S25, S28 and S30 are a section to check the third condition for stop-to-follow mode change from the auto-stop mode SM to the following mode FM.

Figure 6:
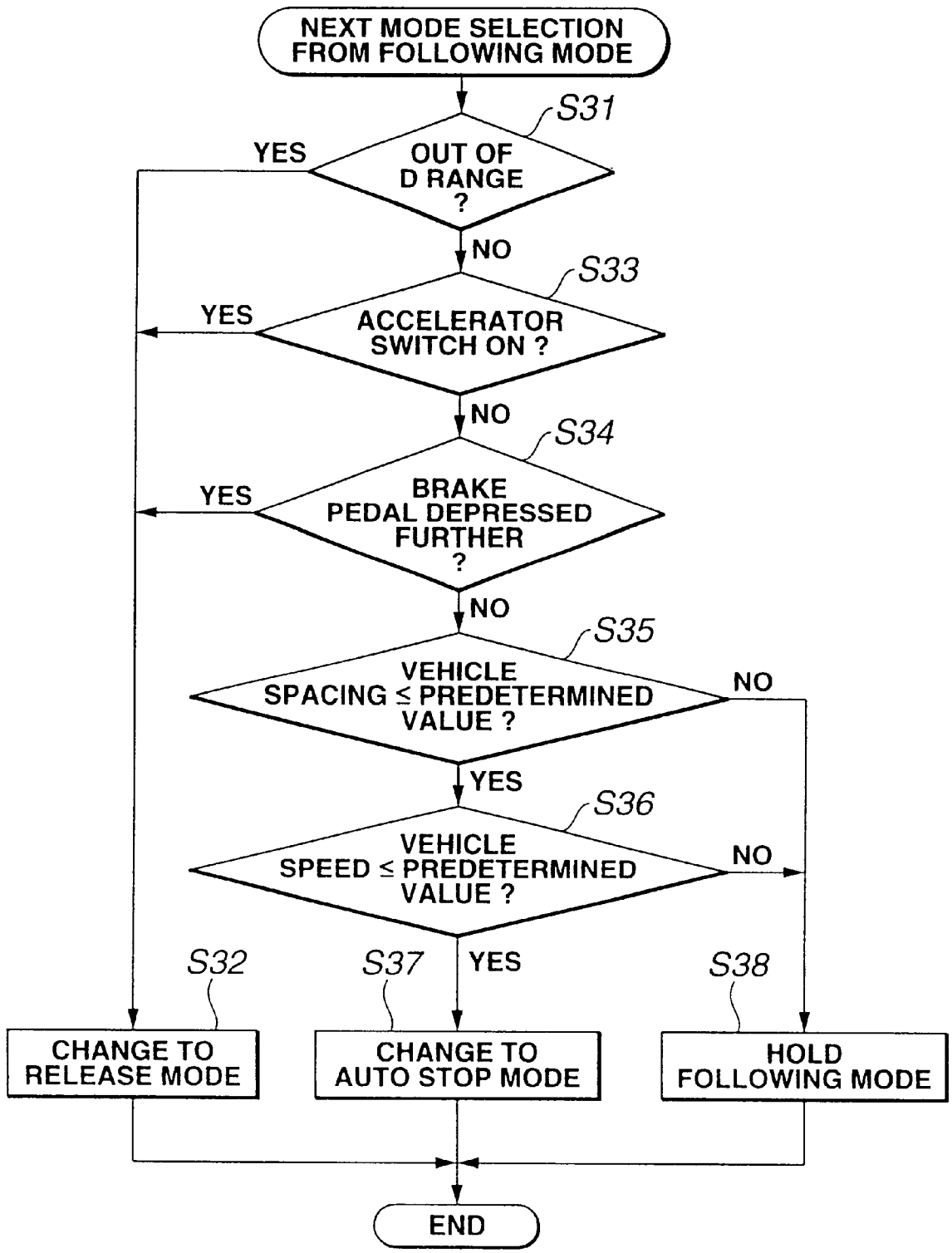
FIG. 6 is a flow chart showing a procedure in a step S106 of FIG. 3, for selecting a next mode from a following mode.

FIG. 6 shows the next mode selecting process from the following mode, of the step S106.

First, at a step S31, the controller 30 examines whether the range of the automatic transmission 3 is shifted out of the drive range or not. If the range of the automatic transmission 3 is other than the drive range, the controller 30 proceeds to a step S32 and changes the control mode to the release mode RM. Thereafter, the controller 30 terminates the process of FIG. 6. In the case of the drive range being held unchanged, the controller 30 proceeds to a step S33.

At the step S33, the controller 30 examines whether the accelerator switch 15 is in the on state or not. If the accelerator switch 15 is in the on state, the controller 30 proceeds to the step S32. If the accelerator switch 15 is not in the on state, then the controller 30 proceeds to a step S34. At the step S34, the controller 30 determines whether the brake pedal 16 is depressed further, by examining whether a current brake pressure PB(n) sensed by the brake pressure sensor 18 is greater than a previous value PB(n−1) of the brake pressure obtained in the previous control cycle. From the step S34, the controller 30 proceeds to the step S32 if the brake pedal 16 is depressed further, and to a step S35 if it is not.

At the step S35, the controller 30 determines whether the vehicle spacing L sensed by the vehicle spacing sensor 12 is equal to or smaller than a predetermine spacing value LL. If L≦LL, the controller 30 proceeds to a step S36. At the step S36, the controller 30 examines whether the actual vehicle speed Vs of the controlled vehicle is equal to or lower than a predetermined speed value VL. If Vs≦VL, the controller 30 proceeds to the step S37, changes the control mode to the auto-stop mode SM at the step S37, and then terminates the process of FIG. 6. If L>LL, or if Vs>VL, the controller 30 proceeds from the step S35 or the step S36 to a step S38, holds the following control mode FM unchanged, and then terminates the process of FIG. 6.

In the next mode selecting process of FIG. 6, the steps S31, S33 and S34 are a program section for checking the seventh condition for mode change from the following mode FM to the release mode RM. The steps S35 and S36 are a section to check the fourth condition for mode change from the following mode FM to the auto-stop mode SM.

Figure 7:
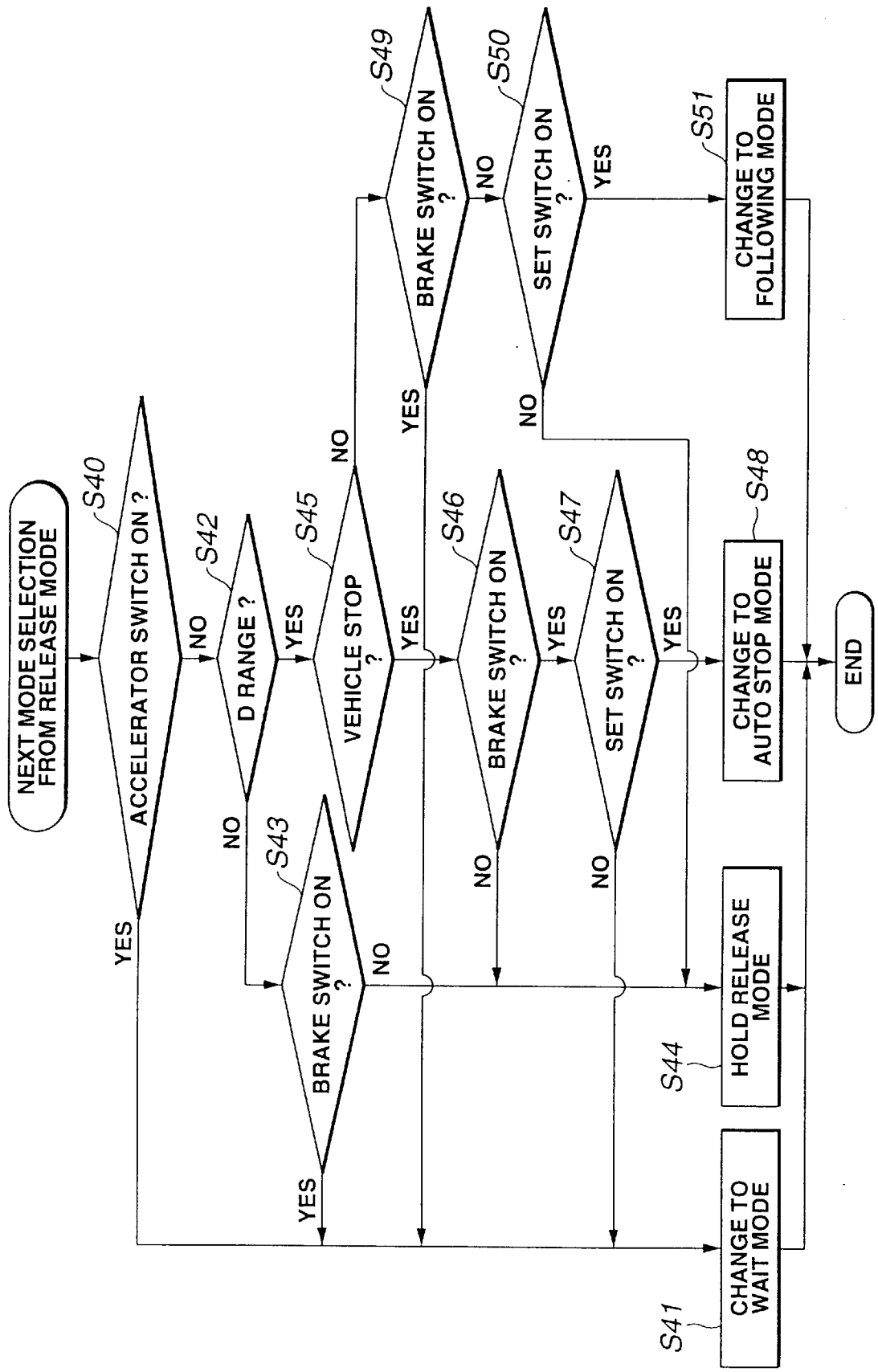
FIG. 7 is a flow chart showing a procedure in a step S107 of FIG. 3, for selecting a next mode from a release mode.

FIG. 7 shows the next mode selecting process from the release mode, of the step S107.

First, the controller 30 examines at a step S40 whether the accelerator switch 15 is in the on state or not. If it is, the controller 30 proceeds to a step S41, changes the control mode to the wait mode WM at the step S41, and then terminates the process of FIG. 7. If the accelerator switch 15 is in the off state, the controller 30 proceeds to a step S42.

At the step S42, the controller 30 examines whether the automatic transmission 3 is in the drive range or not. If the range of the automatic transmission 3 is not the drive range, the controller 30 proceeds to a step S43, and examines at the step S43 whether the brake switch 17 is in the on state or not. If the brake switch 17 is in the on state, the controller 30 proceeds to the step S41. If the brake switch 17 is in the off state, the controller 30 proceeds to a step S44, holds the release mode unchanged and then terminates the process of FIG. 7. In the case of the drive range, the controller 30 proceeds from the step S42 to a step S45.

At the step S45, the controller 30 determines whether the controlled vehicle is in the stop state or not. If the controlled vehicle is in the stop state, the controller 30 proceeds to a step S46, and examines at the step S46 whether the brake switch 17 is in the on state or not. In the case of the brake switch 17 being in the off state, the controller 30 proceeds to the step S44. In the case of the on state, the controller 30 proceeds to a step S47, and examines at the step S47 whether the set switch SWs is in the on state or not. If the set switch SWs is in the off state, the controller 30 proceeds to the step S41. If the set switch SWs is in the on state, the controller 30 proceeds to a step S48, changes the control mode to the auto-stop mode SM at the step S48, and then terminates the process.

If the controlled vehicle is in the running state, the controller 30 proceeds from the step S45 to a step S49, and examines at the step S49 whether the brake switch 17 is in the on state or not. If it is, the controller 30 proceeds to the step S41. If the brake switch 17 is in the off state, the controller 30 proceeds to a step S50, and examines at the step S50 whether the set switch SWs is in the on state or not. If it is in the off state, the controller 30 proceeds to the step S44. If the set switch SWs is in the on state, the controller 30 proceeds from the step S50 to a step S51, changes the control mode to the following mode FM, and terminates the process.

In the process of FIG. 7, the steps S40, S43, S47 and S49 are steps for checking the ninth condition from the release mode to the wait mode. The steps S40, S42, S45, S46 and S47 are steps for checking the sixth condition from the release mode to the auto-stop mode. The steps S40, S42, S45, S49 and S50 are steps for checking the eighth condition from the release mode to the following mode.

Figure 8:
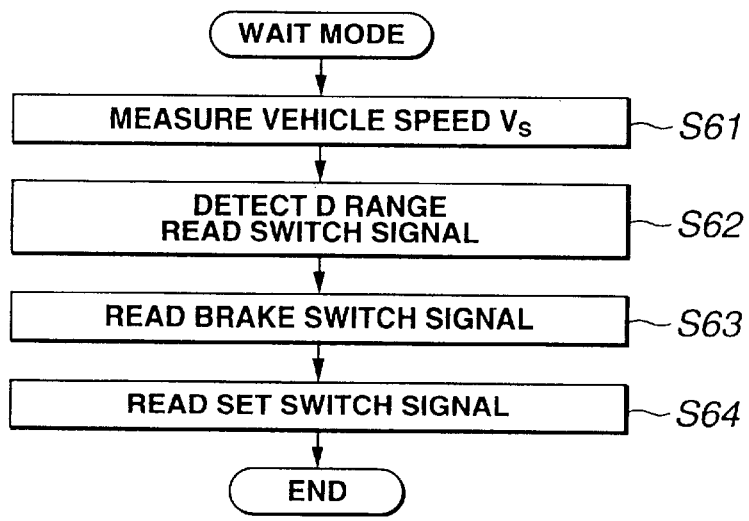
FIG. 8 is a flow chart showing a wait mode procedure performed in the control system of FIG. 1.

FIG. 8 shows a wait mode process of the step S109.

First, at a step S61, the controller 30 calculates the actual vehicle speed Vs. In this example, the controller 30 measures the number of pulses per unit time or the time interval between pulses in each of the sensor signals from the wheel speed sensors 13FL and 13FR, and calculates the front wheel speed VFL and VFR from the thus-measured quantity and the tire outside diameter. Then, the vehicle speed Vs is set equal to an average of the wheel speed VFL and VFR.

Then, at a step S62, the controller 30 reads the switch signal of the drive range detecting switch SWD provided at the drive range position of the select lever for the automatic transmission 3. Then, the controller 30 reads the switch signal of the brake switch 17 at a step S63, further reads the switch signal of the set switch SWs at a step S64, and terminates the process.

Figure 9:
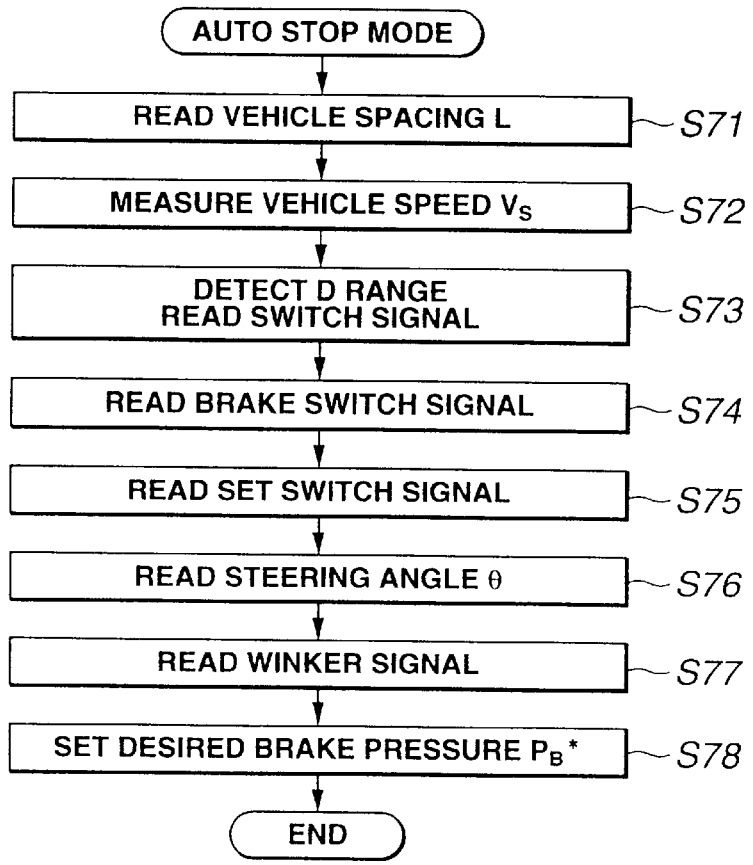
FIG. 9 is a flow chart showing an auto-stop mode procedure performed in the control system of FIG. 1.

FIG. 9 shows the auto-stop mode process of the step S111 shown in FIG. 3.

The controller 30 first reads the vehicle spacing L sensed by the vehicle spacing sensor 12 at a step S71, measures, at a step S72, the vehicle speed Vs in the same manner as in the step S61 of FIG. 8, further reads the switch signal of the drive range detecting switch SWD at a step S73, reads the switch signal of the brake switch 17 at a step S74, reads the switch signal of the set switch SWs at a step S75, reads the steering angle θ sensed by the steering angle sensor 19 at a step S76, and reads a winker signal at a step S77. Then, at a step S78, the controller 30 reads the brake pressure PB sensed by the brake pressure sensor 18, sets a desired brake pressure PB* equal to the thus-obtained value of the brake pressure PB, and delivers the desired brake pressure PB* to the brake control unit 8.

Figure 10:
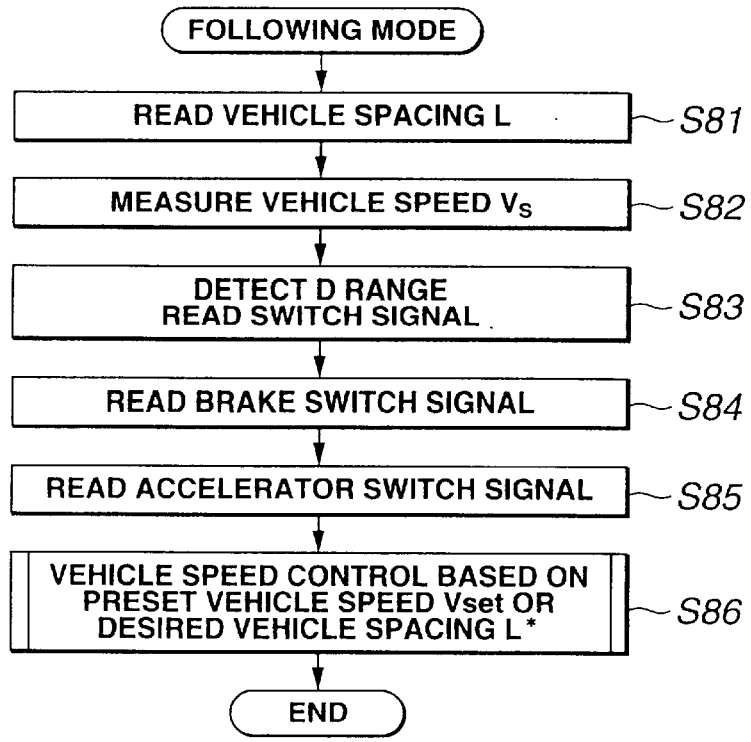
FIG. 10 is a flow chart showing a following mode procedure performed in the control system of FIG. 1.

FIG. 10 shows the following mode process of the step S113 of FIG. 3.

The controller 30 first reads the vehicle spacing L sensed by the vehicle spacing sensor 12 at a step S81, measures, at a step S82, the vehicle speed Vs in the same manner as in the step S61 of FIG. 8, further reads the switch signal of the drive range detecting switch SWD at a step S83, reads the switch signal of the brake switch 17 at a step S84, and reads the switch signal of the accelerator switch 15 at a step S85. Then, at a step S86, the controller 30 calculates a desired vehicle spacing L* from the vehicle speed Vs according to an equation (1) below, calculates a desired vehicle speed V* in accordance with a deviation between the desired vehicle spacing L* and the actual vehicle spacing L, and controls the vehicle speed in accordance with the desired vehicle speed V* by controlling the brake control unit 8, the engine output control unit 9 and the transmission control unit 10.

$$L^* = V_S \times T_{CF} + T_{OF} \tag{1}$$

In this equation, $T_{CF}$ is a time (or time gap) required for the controlled vehicle to reach a position at a distance $L_O$ [m] from a current position of a preceding vehicle in the rear of the preceding vehicle, and $T_{OF}$ is a predetermined offset time.

In the vehicle speed control process, the controller 30 selects a smaller one of the desired vehicle speed V* and the preset vehicle speed Vset set by the driver, as a controlled vehicle speed Vc, calculates a command driving force $F_{OR}$ to bring the actual vehicle speed Vs closer to the controlled vehicle speed Vc, and an estimated disturbance dv' by using an ordinary feedback control system and a vehicle speed servo system based on a robust model matching control technique including a model matching compensator and a robust compensator as disclosed in a U.S. Pat. No. 5,959,572 (corresponding to a Japanese Patent Kokai Publication H10 (1998)-272963), calculates a desired driving/braking force $F^*$ by determining a difference between $F_{OR}$ and dv', and controls the vehicle speed by controlling the brake control unit 8, the engine output control unit 9 and the transmission control unit 10 in accordance with the desired driving/braking force $F^*$. The contents of this U.S. Pat. No. 5,959,572 are herein incorporated by reference.

Figure 11:
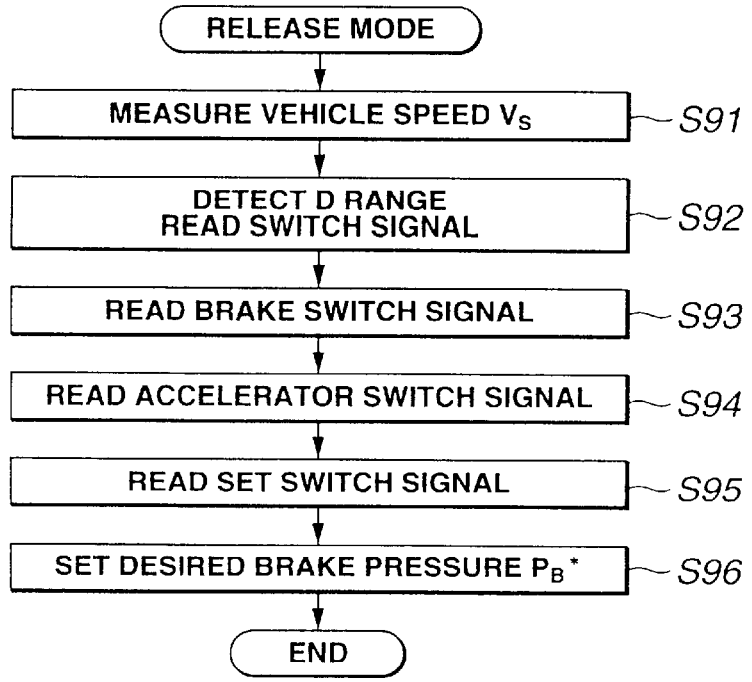
FIG. 11 is a flow chart showing a release mode procedure performed in the control system of FIG. 1.

FIG. 11 shows the release mode process of the step S114 shown in FIG. 3.

The following controller 30 first measures the vehicle speed Vs at a step S91, reads the switch signal of the drive range detecting switch $SW_D$ at a step S92, reads the switch signal of the brake switch 17 at a step S93, reads the switch signal of the accelerator switch 15 at a step S94, and reads the switch signal of the set switch $SW_S$ at a step S95. Then, at a step S96, the controller 30 holds the desired brake pressure $P_B^*$ determined in the auto-stop mode SM or the following mode FM. Alternatively, the controller 30 decreases this desired brake pressure $P_B^*$ by an amount $\Delta P$ each time, and thereby gradually decreases the brake pressure by delivering the gradually decreasing desired brake pressure $P_B^*$ to the brake control unit 8.

The following control process of FIG. 3 serves as following controlling means. The step S61 of FIG. 8, the step S72 of FIG. 9, the step S82 of FIG. 10, the step S91 of FIG. 11 and the wheel speed sensors 13FL and 13FR serve as vehicle speed sensing means.

If the ignition switch $SW_{IG}$ is in the off state, the select lever is in the position for the parking range, the parking brake is applied, and the controlled vehicle and a preceding vehicle are both in the stop state, then the following controller 30 is in the off state disconnected from the power supply, and the control system is in the control off state.

If, in this control off state, the driver turns on the ignition switch $SW_{IG}$, the following controller 30 receives power from the power source and starts the control. In this case, the main switch $SW_M$ is in the off state because the relay circuit 21 is deenergized during the off period of the ignition switch $SW_{IG}$. By initialization at the start of the control, the control system sets the control mode to the wait mode WM, and reads the input information from the switches and sensors. However, the following control process of FIG. 3 is not yet operative.

If, in this state, the main switch $SW_M$ is turned from the neutral position to the on position, the relay circuit 21 is turned on into the self holding state, and holds the switch signal $S_M$ in the on state even if the selector switch 20 is returned to the neutral position.

When the main switch $SW_M$ is turned on in this way, the following controller 30 starts executing the following control process of FIG. 3. Since the control mode is initially set to the wait mode WM, the following controller 30 proceeds from the step S101 to the step S102, and performs the mode selection from the wait mode shown in FIG. 4. The automatic transmission 3 is still in the parking range. Accordingly the following controller 30 proceeds from the step S11 to the step S12 of FIG. 4, and maintains the wait mode WM.

Therefore, the following controller 30 proceeds from the step S108 of FIG. 3 to the step S109 to perform the wait mode control process of FIG. 8. In the wait mode control process, the following controller 30 calculates the vehicle speed Vs (=0), and reads the drive range detecting switch signal $S_{DR}$, the brake switch signal $S_B$ and the set switch signal $S_{SET}$.

If, in this state, the driver selects the drive range with the selector lever while depressing the brake pedal 17, the controller 30 proceeds from the step S11 of FIG. 4 through the steps S13 and S14 to the step S15. However, the set switch $SW_S$ is in the off state, and accordingly the following controller 30 maintains the wait mode WM by proceeding to the step S12.

If the driver turns on the set switch $SW_S$ to start the following control, the following controller 30 proceeds from the step S15 to the step S16, and changes the control mode from the wait mode WM to the auto-stop mode SM. In this auto-stop mode control process of the FIG. 9, the following controller 30 reads the actual vehicle spacing L, measures the actual vehicle speed Vs, and reads the various input information. Moreover, at the step S78, the desired brake pressure $P_B^*$ is set equal to the actual brake pressure $P_B$ sensed by the brake pressure sensor 18, and supplied to the brake control unit 8.

If the driver releases the parking brake and releases the brake pedal 16, and the controlled vehicle is put in the state ready to start, the following controller 30 proceeds through the steps S20~S25 to the step S26, confirms that the accelerator switch 15 is in the off state at the S26, and maintains the auto-stop mode by proceeding to the step S27.

If the controlled vehicle starts moving down a steep downhill by the release of the brake pedal, and the driver depresses the brake pedal 16, the controller 30 proceeds from the step S24 to the step S22, and changes the control mode to the release mode RM. However, the accelerator switch 15 is in the off state, the drive range detecting switch $SW_D$ is in the on state, the controlled vehicle is in the stop state, the brake switch 17 is in the on state. Therefore, in the release mode RM, the following controller 30 proceeds through the steps S40, S42, S45 and S46, to the step S47, and returns to the auto-stop mode SM if the set switch $SW_S$ is turned on again.

If, in the auto-stop mode SM, a preceding vehicle starts moving, and the amount of change of the vehicle spacing L becomes equal to or greater than $\Delta L$, the following controller 30 proceeds from the step S25 in FIG. 5 to the step S28. Therefore, when the driver depresses the accelerator pedal 14 or turns on the set switch $SW_S$, the control mode is changed to the following mode FM pursuant to the driver's intention.

In the following mode FM, the control system calculates the desired acceleration/deceleration so as to bring the actual vehicle spacing to a preceding vehicle sensed by the vehicle spacing sensor 12, closer to the desired vehicle spacing $L^*$, makes the desired driving/braking force $F^*$ positive in accordance with the desired acceleration/deceleration, and delivers the command throttle opening TH to the engine output control unit 9. As a result, the controlled vehicle is started and accelerated.

If the actual vehicle spacing L becomes smaller than the desired spacing $L^*$ due to deceleration of the preceding vehicle or intervention of another vehicle from another lane, the desired driving/braking force $F^*$ becomes negative, and the control system reduces the command throttle opening TH to zero to fully close the throttle valve, produces the shift position signal TS, according to need, to command the transmission control unit 10 to effect downshift to increase the engine braking force, and produces the desired brake pressure P$_B$* corresponding to the desired driving/braking force F*, to the brake control unit 8, so that the controlled vehicle is put in the braking state to decrease the actual vehicle spacing L toward the desired spacing L*. When the actual spacing L becomes close to the desired spacing L*, the shift position signal TS is delivered to the transmission control unit 10 to effect an upshift, and the desired brake pressure P$_B$* is decreased. When the actual spacing L becomes equal to the desired spacing L*, and the desired driving/braking force F* becomes positive, the throttle opening command TH is delivered to the engine output control unit 9, and the control system returns to the driving force control state.

If, in this vehicle spacing controlling state, a preceding vehicle swerves from the lane of the controlled vehicle to another lane, or the controlled vehicle swerves to a passing lane, and hence the headway situation becomes such that no preceding vehicles can be picked up by the spacing sensor 12, then the control system controls the vehicle speed so as to bring the actual vehicle speed. V$_S$ closer to the preset vehicle speed Vset set by the driver.

If, in this following mode, a preceding vehicle slows down and stops at a traffic signal, the control system decreases the vehicle speed of the controlled vehicle to zero so as to maintain the desired vehicle spacing L* by outputting the desired brake pressure P$_B$*. In this case, the desired spacing L* is decreased as the vehicle speed V$_S$ decreases. When, therefore, the actual spacing L sensed by the spacing sensor 12 becomes equal to or smaller than the predetermined value L$_L$, and the vehicle speed V$_S$ becomes equal to or lower than the predetermined value V$_L$, then the control system proceeds through the steps S31 and S33–S36 to the step S37 in the mode selection process of FIG. 6, changes the control mode to the auto-stop mode SM, and holds the brake pressure P$_B$ at the then-existing level.

If, thereafter, the preceding vehicle starts, the control system returns the control mode to the following mode, as mentioned before, in response to a driver's operation to turn on the accelerator switch 15 by depression of the accelerator pedal, or a driver's operation to turn on the set switch SWs again.

If, in the following mode, the driver selects the second speed range with the select lever to produce an engine braking on a long downhill slope, the switch signal S$_D$ of the drive range detecting switch SW$_D$ turns off, and hence the control system changes the control mode to the release mode RM by following the course from the step S31 to the step S32. If the desired brake pressure P$_B$* is produced in the following mode immediately before the mode change from the following mode to the release mode, the control system holds the desired brake pressure P$_B$* at the magnitude immediately before the mode change or decrease the desired brake pressure P$_B$* gradually.

If, in this running state in the release mode with the transmission in the second speed range, the brake switch 17 turns on by depression of the brake pedal 16, the control system returns the control mode to the wait mode WM by following the course from the step S43 to the step S41.

Moreover, the control mode is changed from the following mode FM to the release mode if the accelerator switch 15 turns on by depression of the accelerator pedal 14 or if the brake pedal 16 is depressed further.

From the release mode RM, the control system returns the control mode to the wait mode if the accelerator switch 15 turns on by depression of the accelerator pedal 14, if the accelerator switch 17 is off, but the brake switch 17 turns on by depression of the brake pedal 16 in the running state with the transmission in the drive range, or if the controlled vehicle stops and the set switch SWs is off. If, however, in the running state in the drive range, the brake switch 17 is off and the set switch SWs is off, then the control system holds the release mode RM. The control mode is changed to the following mode FM if the set switch SWs is turned on in the running state in the drive range, and to the auto-stop mode SM if the controlled vehicle stops in the drive range and the set switch SWs is turned on.

If, in the wait mode WM, the set switch SWs is turned on after a start of the vehicle, then the control system changes the control mode from the wait mode to the following mode as in the conventional system. If the main switch SW$_M$ is turned off or the ignition switch SW$_{IG}$ is turned off, then the control system terminates the following control process of FIG. 3 and turns in the control off state.

In the thus-constructed control system, the control system is set to the wait mode WM by turn-on of the main switch SWM. In this state, the driver can change the control mode to the auto-stop mode or the following mode by turning on the set switch SWs in the drive range, and by so doing, starts the following control at a desired timing.

Moreover, after a mode change to the auto-stop mode or the release mode, the control system holds the brake pressure, if any, in the previous mode, and thereby prevents unnatural feeling by preventing abrupt change in the brake pressure.

Figure 12:
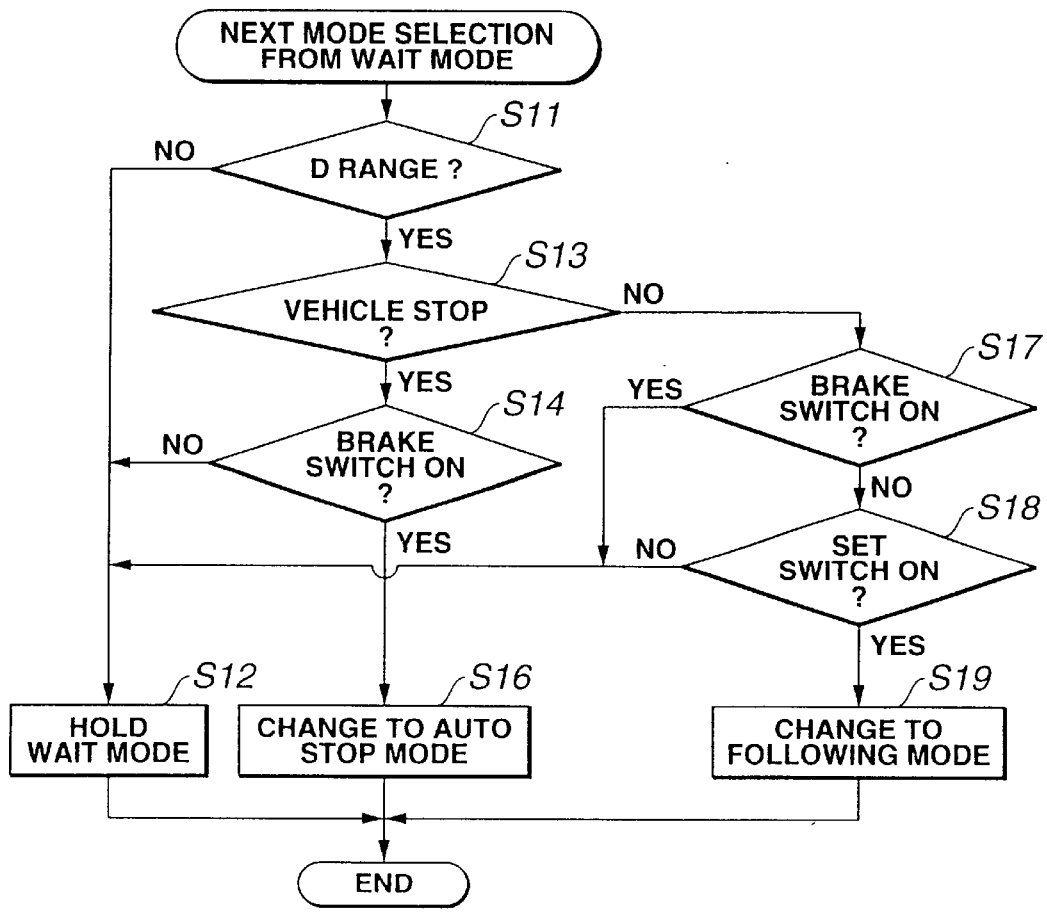
FIG. 12 is a flow chart showing another example of the procedure in the step S102 of FIG. 3, for selecting the next mode from the wait mode.

FIG. 12 shows another practical example according to the first embodiment of the present invention. In the second example, the step S15 shown in FIG. 4 is omitted in the mode selection from the wait mode WM, so that the first condition for mode change from the wait mode to the auto-stop mode SM does not include a condition about the set switch SWs. In FIG. 12, if the brake switch 17 is in the on state, the following controller 30 proceeds directly from the step S14 to the step S16 and effects a mode change to the auto-stop mode SM.

Similarly, as to the second through eighth conditions, too, it is optional to omit the decision step of checking the on state of the set switch SWs.

As to the ninth condition for mode change from the release mode RM to the wait mode WM, the next mode selection process in the example shown in FIG. 7 is designed to check the on state of the accelerator switch 15 or the brake switch 17. However, it is optional to arrange the control system so that the following controller 30 decreases the desired brake pressure P$_B$* gradually ΔP by ΔP at the step S96 in the release mode process of FIG. 11, and then effects a mode change from the release mode RM to the wait mode WM when the desired brake pressure PB* becomes equal to or lower than a predetermined pressure value. In this case, it is possible to use the sensed actual brake pressure in place of the desired brake pressure P$_B$*.

In the step S96 in the release mode process of FIG. 11, it is optional to vary the rate of decrease of the desired brake pressure P$_B$* in accordance with the vehicle spacing and/or the vehicle speed. For example, the control system decreases the desired brake pressure P$_B$* more gradually in the presence of a preceding vehicle than in the absence of a preceding vehicle, by making the decrease quantity ΔP smaller when a preceding vehicle is detected. In another example, the control system decreases the desired brake pressure PB* more gradually by decreasing ΔP when the vehicle spacing to a preceding vehicle becomes smaller. In still another example, the control system makes smaller the decrease quantity ΔP with decrease in the vehicle speed, and thereby causes the desired brake pressure P$_B$* to decrease more gradually in a lower vehicle speed region than in a higher vehicle speed region.

In the first embodiment, the 7th condition for mode change from the following mode to the release mode does not include a condition about the cancel switch SWc. However, in the selection process of FIG. 6, it is optional to add a decision step (similar to the step S20) for checking whether the cancel switch SWc is in the on state or not. For example, the step S32 is reached if the cancel switch SWc is in the on state, and the step S31 is reached if the cancel switch SWc is in the off state.

In the preceding examples, the wheel speed sensors 13FL and 13FR are used as a vehicle speed sensor. However, the vehicle speed sensor may be arranged to sense rotation of the output shaft of the automatic transmission 3. It is further optional use, as the vehicle speed, a vehicle body speed estimated from wheel speeds by an anti-skid brake control system (or by a means for estimating a vehicle body speed).

In the preceding examples, the desired spacing L* is calculated in accordance with the actual vehicle speed Vs. However, the present invention is not limited to this. The control system may be arranged to calculate the desired spacing L* by determining a relative speed ΔV by differentiating the actual vehicle speed L with a band pass filtering operation or a high-pass filtering operation, to calculates a preceding target speed Vt of a preceding vehicle by adding the relative speed ΔV to the actual vehicle speed Vs, and to calculate the desired spacing L* in accordance with the target speed Vt.

The present invention is not limited to the laser radar sensor. The vehicle spacing sensor 12 may be a sensor utilizing a millimeter wave radar, or may be an image processing system arranged to calculate the vehicle spacing by processing images produced by a stereo camera.

FIGS. 13~16 show a second embodiment of the present invention.

Figure 13:
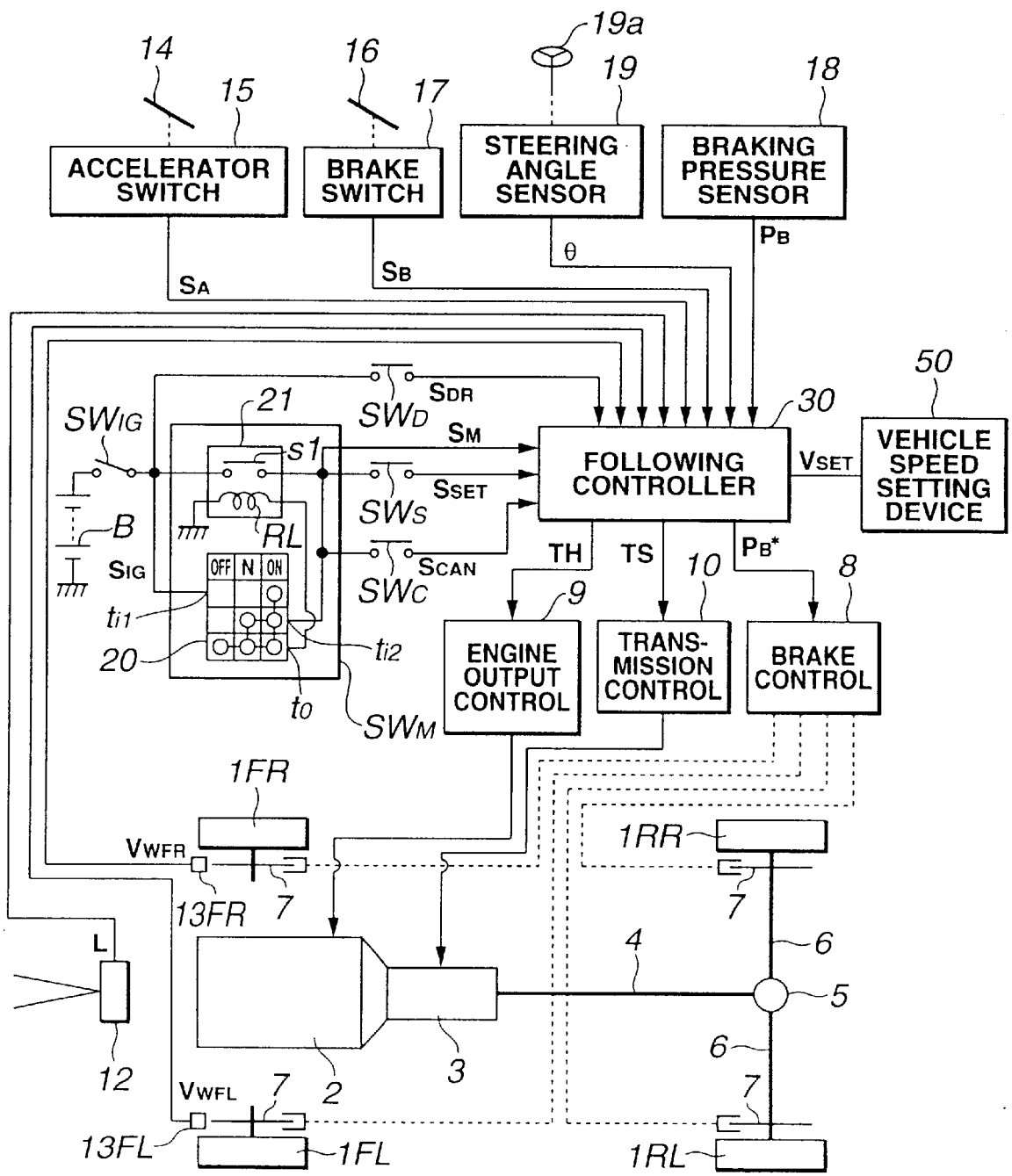
FIG. 13 is a schematic view showing a preceding vehicle following control system according to a second embodiment of the present invention.

FIG. 13 shows a vehicle following control system according to the second embodiment. This control system includes a vehicle speed setting device 50 for setting and adjusting the preset vehicle speed Vset, in addition to the components shown in FIG. 1. In the second embodiment, the driver can set and change the preset vehicle speed Vset with the input device 50 in predetermined control modes.

Figure 14:
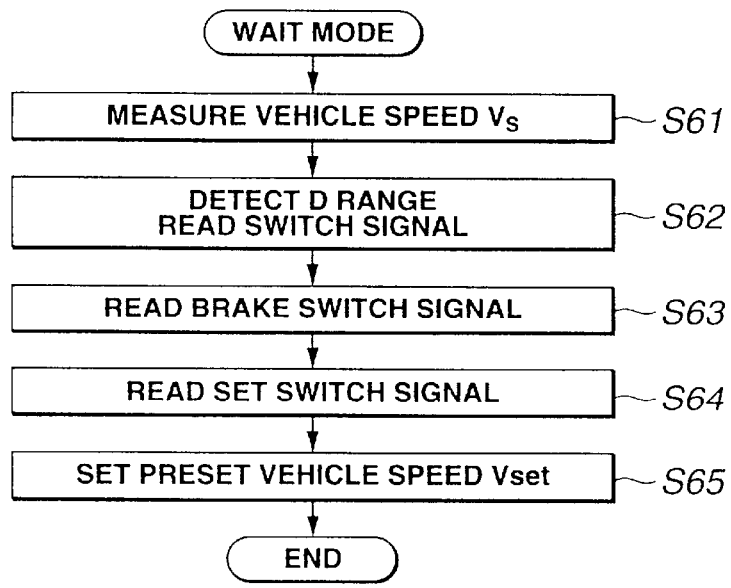
FIG. 14 is a flow chart showing a wait mode procedure according to a second embodiment of the present invention.
Figure 15:
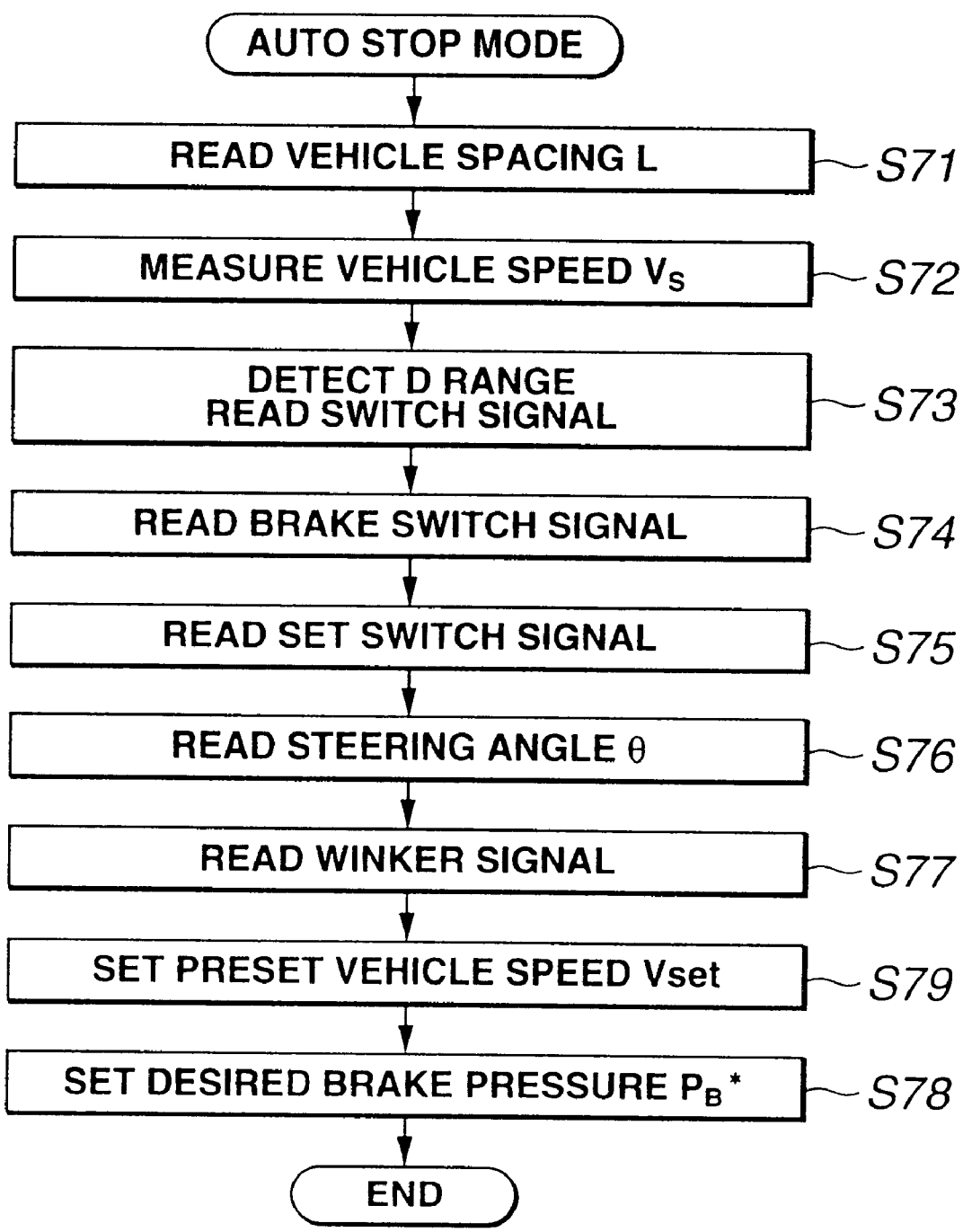
FIG. 15 is an auto-stop mode procedure according to the second embodiment.
Figure 16:
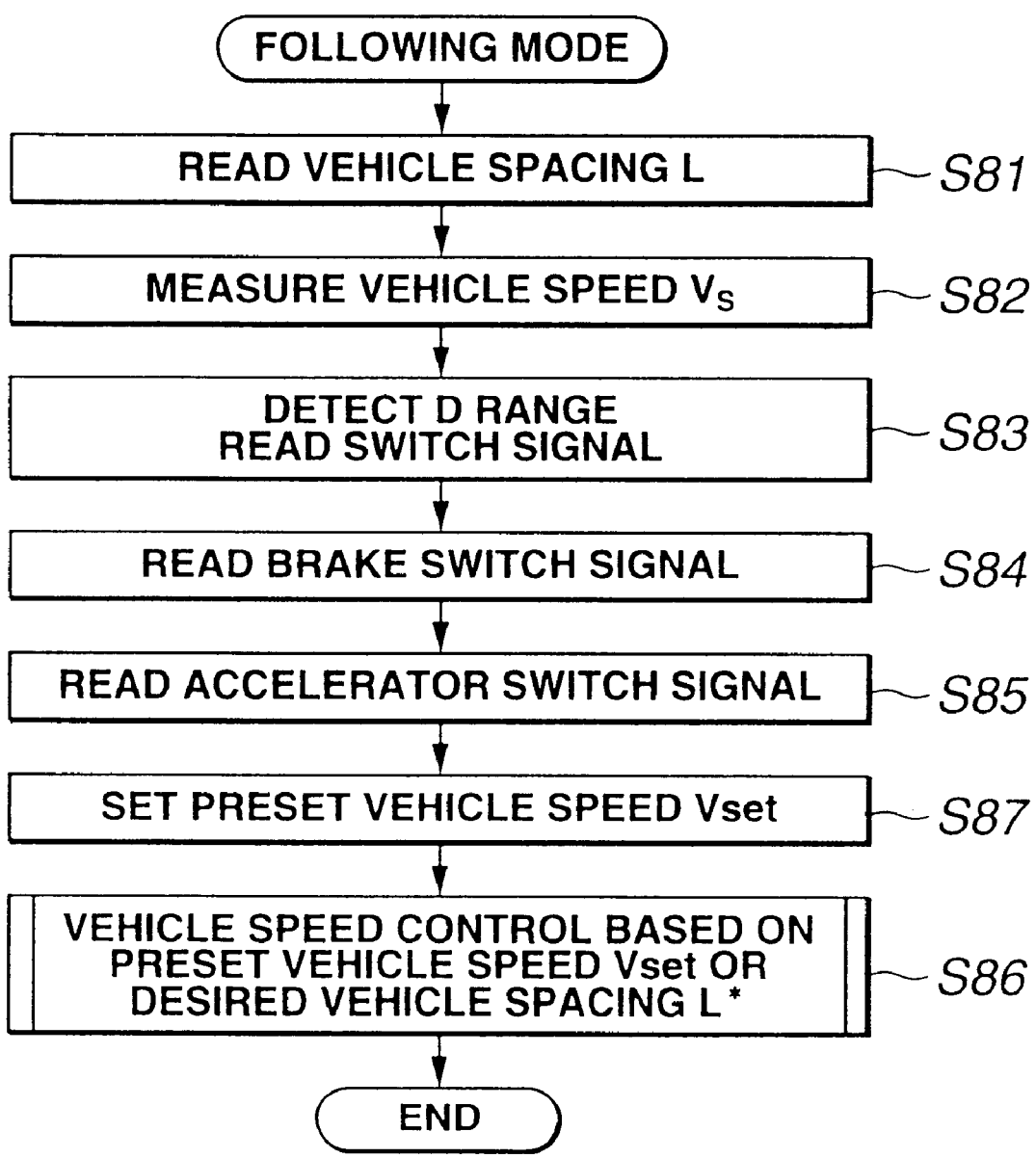
FIG. 16 is a flow chart showing a following mode procedure according to the second embodiment.

A step for adjusting the preset vehicle speed Vset is added in each of FIGS. 13~15. The wait mode control process of FIG. 13 is different from FIG. 8 in the addition of a set speed adjusting step 65 after the step S64. The auto-stop mode control process of FIG. 14 is different from FIG. 9 in the addition of a set speed adjusting step S79 between the steps S77 and S78. The following mode control process of FIG. 15 is different from FIG. 10 in the addition of a set speed adjusting step S87 between the steps S85 and S86.

As to the preset vehicle speed adjusting operation in the steps S65 and S87, the control system may be arranged to enable the driver to adjust the preset vehicle speed by turning on a switch such as a resume switch to set the current vehicle speed Vs as the preset vehicle speed Vset, or by varying the preset vehicle speed Vset by turning on an adjusting or setting switch and performing a count-up or count-down operation. If the controlled vehicle is in the stop state, the driver can adjust the preset speed by count-up or count-down operation in the on state of an adjusting or setting switch. Moreover, a ten key pad can be used for inputting the preset vehicle speed Vset. Similarly, as to the preset vehicle speed adjusting operation in the step S79, the control system can use an adjusting or setting switch for adjusting the preset vehicle speed Vset by count-up or count-down, or a ten key pad for adjusting the preset speed Vset.

In this control system according to the second embodiment, the driver can perform the preset speed adjusting operation in each of the wait mode, the auto-stop mode and the following mode. Specifically in the wait mode and the auto-stop mode, the driver can adjust the preset speed Vset securely without error or influence on the driving operation in the stop state of the vehicle.

The following control can be achieved in various manners. The control system can perform the vehicle speed control by calculating the desired vehicle speed V* in accordance with the deviation of the actual vehicle spacing L from the desired spacing L* and controlling the vehicle speed so as to reduce the deviation of the actual vehicle speed Vs from the desired vehicle speed V*, or in some other appropriate way. The control system may be arranged to calculate the desired acceleration/deceleration in accordance with the deviation of the actual spacing L from the desired spacing L* and to control the brake control unit 8, the engine output control unit 9 and the transmission control unit 10 in accordance with the desired acceleration/deceleration.

The vehicle shown in FIG. 1 has the disc brakes 7. The present invention is not limited to the disc brake system. In the case of an electric vehicle having a regenerative braking system, the control system may be arranged to control the regenerative braking force. In the case of a brake system having an electric motor as a brake actuator, the control system can perform the braking force electrically. The present invention can employ any brake system capable of controlling a braking force.

In the example of FIG. 1, the automatic transmission 3 is on the output side of the engine 2. However, the present invention is not limited to this arrangement. The present invention is applicable to a vehicle having a continuously variable transmission.

The present invention is applicable not only to a rear wheel driver vehicle, but to a front wheel drive vehicle or a four wheel drive vehicle. Furthermore, the present invention is applicable to an electric vehicle having an electric motor instead of the engine 2 and a hybrid vehicle having an electric motor in addition to the engine 2. In this case, the control unit 10 may be arranged to control the electric motor.

In the illustrated embodiments, the steps S61~S64, S71–S77, S81~S85, S91~S95 correspond to collecting means for collecting input information on vehicle operating conditions of the controlled vehicle. The step S78, S86 and S96 correspond to means for controlling at least one of driving force and braking force. The steps S16, S19, S22, S29, S32, S37, S41, S48 and S51 correspond to means for changing the control mode among the four modes shown in FIG. 2. The steps S22 and S32 correspond to releasing means for changing the control mode from one of the auto-stop mode and the following mode, to the release mode. The step S41 corresponds to returning means for returning the control mode to the wait mode from the release mode. The decision steps Sll, S13~S15, S17, S18, S20~S26, S28, S30, S31, S33~S36, S40, S42, S43, S45~S47, S49 and S50 correspond to discriminating means for producing condition signals for effecting mode changes.

This application is based on a prior Japanese Patent Application No. H11(1999)-186497. The entire contents of this Japanese Patent Application No. H11(1999)-186497 with a filing date of Jun. 30, 1999 in Japan are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A preceding vehicle following control apparatus for a controlled vehicle, comprising:
   a following controller
      collecting input information on vehicle operating conditions of the controlled vehicle, inclusive of a sensed actual vehicle speed of the controlled vehicle and a sensed actual vehicle spacing from the controlled vehicle to a preceding vehicle,
      controlling a longitudinal force of the controlled vehicle in accordance with the actual vehicle speed and the actual vehicle spacing in a following mode,
      setting a control mode initially to a wait mode,
      changing the control mode from the wait mode to one of the following mode and an auto-stop mode to hold the controlled vehicle in a stop state by producing a braking force,
      allowing the control mode to change among the auto-stop mode, the following mode and a release mode to stop a driving force control and prevent abrupt decrease of a braking force of the controlled vehicle, and
      returning the control mode to the wait mode from the release mode.

2. The preceding vehicle following control apparatus as claimed in claim 1, wherein the following control apparatus further comprises an input section for sensing the vehicle operating conditions and supplying the input information to the following controller, the input section comprises a speed sensor sensing a vehicle operating condition to determine the actual vehicle speed of the controlled vehicle, a spacing sensor sensing the actual vehicle spacing from the controlled vehicle to a preceding vehicle, and an input device producing a start command signal to start a following control, the following controller is configured to set the control mode to the wait mode in response to the start command signal, and to perform one of a spacing control to bring the actual spacing closer to a desired spacing, and a speed control to bring the actual vehicle speed closer to a preset vehicle speed, the following controller is configured to determine a desired vehicle speed in accordance with the vehicle spacing and to control at least one of a driving force and a braking force of the controlled vehicle in accordance with at least one of the desired vehicle speed and the preset vehicle speed in the following control mode, and the following controller is further configured to change the control mode from the wait mode to one of the following mode and the auto-stop mode in accordance with the input information, and to allow the control mode to change among the auto-stop mode, the following mode and the release mode in accordance with the input information.

3. The preceding vehicle following control apparatus as claimed in claim 1, wherein the following controller is configured to effect:
   (i) a wait-to-stop mode change from the wait mode to the auto-stop mode if an automatic transmission of the controlled vehicle is in a drive range, and at the same time the controlled vehicle is in a stop state;
   (ii) a wait-to-follow mode change from the wait mode to the following mode if the automatic transmission is in the drive range, and at the same time a brake system of the controlled vehicle is in an inoperative state;
   (iii) a stop-to-follow mode change from the auto-stop mode to the following mode if the actual vehicle spacing sensed by the spacing sensor increases;
   (iv) a follow-to-stop mode change from the following mode to the auto-stop mode if the actual vehicle spacing is equal to or smaller than a predetermined spacing value and at the same time the actual vehicle speed is equal to or lower than a predetermined speed value;
   (v) a stop-to-release mode change from the auto-stop mode to the release mode in response to a driver's operation which is one of a steering operation and a transmission's range change operation;
   (vi) a release-to-stop mode change from the release mode to the auto-stop mode if the controlled vehicle is in the stop state and at the same time the automatic transmission is in the drive range;
   (vii) a follow-to-release mode change from the following mode to the release mode in response to a driver's operation which is one of an accelerating operation, a decelerating operation and a driver's range change operation;
   (viii) a release-to-follow mode change from the release mode to the following mode if the controlled vehicle is in a running state and at the same time the automatic transmission is in the drive range; and
   (ix) a release-to-wait mode change from the release mode to the wait mode in response to a driver's operation to manipulate at least one of a driving force and a braking force.

4. The preceding vehicle following control apparatus as claimed in claim 1, wherein the following controller is configured to control the vehicle speed in accordance with a preset vehicle speed in the following mode, and to allow the preset vehicle speed to be adjusted in the auto-stop mode.

5. The preceding vehicle following control apparatus as claimed in claim 1, wherein the following controller is configured to control the vehicle speed in accordance with a preset vehicle speed in the following mode, and to allow the preset vehicle speed to be adjusted in the wait mode.

6. The preceding vehicle following.control apparatus as claimed in claim 1, wherein the following control apparatus further comprises an input device determining a preset vehicle speed, and the following controller is configured to control the actual vehicle speed in accordance with the preset vehicle speed in the following mode, and to adjust the preset vehicle speed in accordance with a signal from the input device in at least one of the auto-stop mode and the wait mode.

7. The preceding vehicle following control apparatus as claimed in claim 1, wherein the following controller is configured to effect a wait-to-stop mode change from the wait mode to the auto-stop mode in response to a driver's braking operation when the controlled vehicle is in a stop state.

8. The preceding vehicle following control apparatus as claimed in claim 1, wherein the following controller is configured to effect a release-to-wait mode change from the release mode to the wait mode in response to a driver's operation for increasing a braking force of the controlled vehicle.

9. The preceding vehicle following control apparatus as claimed in claim 1, wherein the following controller is configured to decrease the braking force gradually from a level in the following mode upon a follow-to-release mode change from the following mode to the release mode, and to effect a release-to-wait mode change from the release mode to the wait mode if the braking force becomes equal to or lower than a predetermined braking force value.

10. The preceding vehicle following control apparatus as claimed in claim 1, wherein the following controller is configured to perform, in the release mode, one of a brake force decreasing control to decrease the braking force gradually in accordance with at least one of the vehicle spacing to a preceding vehicle, and the vehicle speed of the controlled vehicle, and a brake force holding control to hold the braking force, and to effect a release-to-wait mode change from the release mode to the wait mode in response to one of a first release-to-wait mode change condition signal which is produced if the braking force becomes equal to or lower than a predetermined braking force value, and a second release-to-wait mode change condition signal which is produced in response to a driver's operation for manipulating one of braking force and driving force.

11. The preceding vehicle following control apparatus as claimed in claim 1, wherein the following controller is configured to allow a wait-to-stop mode change from the wait mode to the auto-stop mode if and only if the controlled vehicle is in a stop state, to allow a wait-to-follow mode change the wait mode to the following mode if and only if the controlled vehicle is not in the stop state, to change the control mode between the auto-stop mode and the following mode in accordance with at least one of the actual vehicle spacing and the actual vehicle speed, to change the control mode to the release mode from one of the auto-stop mode and the following mode in response to a driver's first operation, and to change the control mode to the wait mode only from the release mode in response to a driver's second operation.

12. The preceding vehicle following control apparatus as claimed in claim 11, wherein the following control apparatus comprises an input device detecting a driver's driving operation, a second input device detecting a driver's braking operation and a third input device detecting a driver's transmission shift operation, the driver's first operation being one of the driver's driving operation, the driver's braking operation and the driver's shift operation, the driver's second operation being one of the driver's driving operation and the driver's braking operation.

13. The preceding vehicle following control apparatus as claimed in claim 3, wherein the following controller is configured to effect the stop-to-follow mode change from the auto-stop mode to the following mode if an amount of increase in the actual vehicle spacing sensed by the spacing sensor is equal to or greater than a predetermined value, and to effect the stop-to-release mode change from the auto-stop mode to the release mode in response to a driver's operation which is one of a transmission range change operation to shift an automatic transmission out of a drive range, and a steering operation increasing a steering amount to a value equal to or greater than a predetermined value.

14. A preceding vehicle following control apparatus for a controlled vehicle, comprising:
collecting means for collecting input information on vehicle operating conditions of the controlled vehicle, the input information including a sensed actual vehicle speed of the controlled vehicle and a sensed actual vehicle spacing from the controlled vehicle to a preceding vehicle;
controlling means for controlling at least one of driving force and braking force of the controlled vehicle in accordance with the actual vehicle speed and the actual vehicle spacing in a following mode;
first mode changing means for changing a control mode from a wait mode to an auto-stop mode for holding the controlled vehicle in a stop state, in response to a wait-to-stop condition signal produced in accordance with the input information;
second mode changing means for changing the control mode from the wait mode to the following mode in response to a wait-to-follow condition signal produced in accordance with the input information;
releasing means for changing the control mode from one of the auto-stop mode and the following mode, to a release mode in response to a release condition signal produced in accordance with the input information; and
returning means for returning the control mode to the wait mode from the release mode in response to a release-to-wait condition signal produced in accordance with the input information.

15. The preceding vehicle following control apparatus as claimed in claim 14, further comprising discriminating means for producing the wait-to-stop condition signal if a transmission of the controlled vehicle is in a predetermined driving state and at the same time the controlled vehicle is in the stop state, producing the wait-to-follow condition signal if the transmission is in the driving state and at the same time the controlled vehicle is not in the stop state, and producing the release condition signal in response to a driver's operation which is a shift operation to bring the transmission out of the predetermined driving state, a braking operation and an accelerating operation.

16. A preceding vehicle following control process, comprising:
performing a following control in one of a following mode for controlling a longitudinal force of the controlled vehicle in accordance with a sensed actual vehicle speed of the controlled vehicle and a sensed actual vehicle spacing from the controlled vehicle to a preceding vehicle, and an auto-stop mode for holding the controlled vehicle in a stop state;
changing a control mode from a wait mode to the auto-stop mode in response to a wait-to-stop condition signal;
changing the control mode from the wait mode to the following mode in response to a wait-to-follow condition signal;
changing the control mode from one of the auto-stop mode and the following mode, to a release mode for canceling the following control, in response to a release condition signal; and
returning the control mode to the wait mode from the release mode in response to a release-to-wait condition signal.

17. The preceding vehicle following control process as claimed in claim 16, wherein the wait-to-stop condition signal is produced only when the controlled vehicle is in a stop state, the wait-to-follow condition signal is produced only when the controlled vehicle is not in the stop state, and the release condition signal is produced in response to a driver's operation indicative of a driver's intention of canceling the following control.

18. The preceding vehicle following control process as claimed in claim 17, further comprising:
producing the wait-to-stop condition signal if a transmission of the controlled vehicle is in a predetermined drive state;
producing the wait-to-follow condition signal if the transmission is in the drive state, and a brake system of the controlled vehicle is in an inoperative state;
producing a stop-to-follow condition signal to effect a mode change from the auto-stop mode to the following mode, in accordance with the actual vehicle spacing;

producing a follow-to-stop condition signal to effect a mode change from the following mode to the auto-stop mode in accordance with the actual vehicle spacing and the actual vehicle speed;

producing the release condition signal which is one of a stop-to-release condition signal to effect a mode change from the auto-stop mode to the release mode, and a follow-to-release condition signal to effect a mode change from the following mode to the release mode;

producing a release-to-stop condition signal to effect a mode change from the release mode to the auto-stop mode if the controlled vehicle is in the stop state and the transmission is in the drive state;

producing a release-to-follow condition signal to effect a mode change from the release mode to the following mode if the controlled vehicle is not in the stop state and the transmission is in the drive state; and producing the release-to-wait condition signal in response to a driver's operation which is one of the accelerating operation and the braking operation.

* * * * *